US009201693B2

(12) United States Patent
Fuller et al.

(10) Patent No.: US 9,201,693 B2
(45) Date of Patent: Dec. 1, 2015

(54) QUOTA-BASED RESOURCE MANAGEMENT

(75) Inventors: Jason Fuller, Bellevue, WA (US);
Abolade Gbadegesin, Seattle, WA (US);
Vijayendra G. R. Vasu, Redmond, WA (US); Yasser Shaaban, Seattle, WA (US); Justin Horst, Bellevue, WA (US);
Akhilesh Kaza, Sammamish, WA (US);
Conrad Chang, Bellevue, WA (US);
David Andrew Whitechapel, Seatle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 13/603,404

(22) Filed: Sep. 4, 2012

(65) Prior Publication Data

US 2014/0068624 A1    Mar. 6, 2014

(51) Int. Cl.
*G06F 9/46* (2006.01)
*G06F 9/50* (2006.01)

(52) U.S. Cl.
CPC ............... *G06F 9/50* (2013.01); *G06F 9/5011* (2013.01); *G06F 9/5022* (2013.01)

(58) Field of Classification Search
CPC ....... G06F 9/52; G06F 9/5016; G06F 9/5077; G06F 9/4881; G06F 9/4843; G06F 9/50; G06F 9/5011; G06F 9/5022
See application file for complete search history.

(56) References Cited

U.S. PATENT DOCUMENTS 6,393,455 B1 * 5/2002 Eilert et al. .................. 718/105
6,799,208 B1    9/2004 Sankaranarayan et al.
7,137,119 B1   11/2006 Sankaranarayan et al.
7,380,039 B2 * 5/2008 Miloushev et al. ........... 710/244
7,934,035 B2 * 4/2011 Miloushev et al. ........... 710/244
8,091,088 B2 * 1/2012 Kishan et al. ................. 718/104
8,656,077 B2 * 2/2014 Miloushev et al. ........... 710/104
2003/0061260 A1   3/2003 Rajkumar
2005/0097560 A1   5/2005 Rolia et al.
2005/0240928 A1  10/2005 Brown et al.
2006/0190482 A1 * 8/2006 Kishan et al. ............. 707/103 Y
2008/0282253 A1  11/2008 Huizenga
2009/0222491 A1   9/2009 Larkin et al.
2012/0096167 A1   4/2012 Free et al.

(Continued)

OTHER PUBLICATIONS

"Memory Management in Android," downloaded from http://mobworld.wordpress.com/2010/07/05/memory-management-in-android/, 8 pp. (document marked Jul. 5, 2010).

(Continued)

*Primary Examiner* — Van Nguyen
(74) *Attorney, Agent, or Firm* — Timothy Churna; Judy Yee; Micky Minhas

(57) ABSTRACT

Innovations for resource management are described herein. For example, resource management organizes resources as pools that are associated with different types of workloads. The resource management can be implemented as part of an application layer framework and/or operating system of a computing device. A budget is established at design time for the resources of the computing device. Each type of workload primarily draws from resources dedicated to that type of workload in the associated pool under the budget, as enforced by the operating system. This can help provide acceptable performance for those workloads that are permitted to run, while preventing resources of the mobile computing device from becoming spread too thin among workloads. It can also help maintain a good overall balance among different types of workloads.

21 Claims, 25 Drawing Sheets

(56) References Cited

U.S. PATENT DOCUMENTS

| | | | |
|---|---|---|---|
| 2012/0115495 A1 | 5/2012 | Rousselin et al. | |
| 2012/0122461 A1 | 5/2012 | Hossain et al. | |
| 2012/0210326 A1* | 8/2012 | Torr et al. | 718/103 |

OTHER PUBLICATIONS

Heiser et al., "Resource Management in the Mungi Single-Address-Space Operating System," University of New South Wales, School of Computer Science and Engineering Technical Report No. UNSW-CSE-TR-9705, 15 pp. (Aug. 1997).

International Search Report and Written Opinion dated Aug. 27, 2013, from International Patent Application No. PCT/US2013/056696, 13 pp.

Anonymous, "cgroups," Wikipedia, 6 pages (retrieved Jun. 29, 2015).

Anonymous, "CGroups," *Arch Wiki*, https://wiki.archlinux.org/index.php/Cgroups, 5 pages (retrieved Jun. 29, 2015).

Anonymous, "Class-based Kernel Resource Management (CKRM)," http://ckm.sourceforge.net/, 3 pages (retrieved Jul. 29, 2015).

Franke et al., "Enabling Autonomic Workload Management in Linux," *Proc. Int'l Conf. on Autonomic Computing*, 2 pp. (2004).

Henningsen et al., "How I Used CGroups to Manage System Resources," *Oracle Linux 6*, http://www.oracle.com/technetwork/articles/servers-storage-admin/resource-controllers-linux-1506602.html, 8 pages (Jan. 2012).

Menage, "CGROUPS," https://www.kernel.org/doc/Documentation/cgroups/cgroups.txt, 12 pages (retrieved Jun. 29, 2015).

Nagar et al., "Class-based Prioritized Resource Control in Linux," *Ottawa Linux Symposium 2003*, 21 pp. (2003).

Nagar et al., "Improving Linux Resource Control Using CKRM," *Ottawa Linux Symposium 2004*, 16 pp. (2004).

Nagar et al., "Writing Controllers for CKRM," http://ckrm.sourceforge.net/ckrm-controller-howto.txt, 5 pages (2006).

* cited by examiner

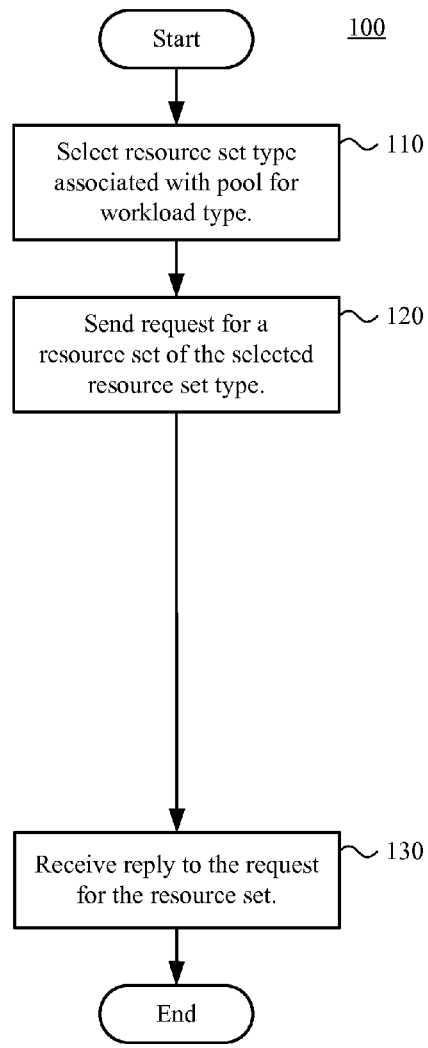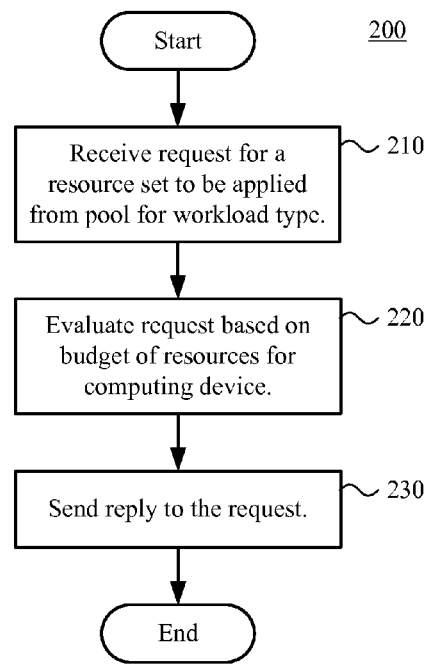

Figure 4a 400

| Pool | Associated Workload | Processor Percentage | Memory Limit |
|---|---|---|---|
| A | system | 20% | 200 MB |
| B | foreground | 60% | 150 MB |
| C | background UX | 30% | 50 MB |
| D | other background processing | 10% | 30 MB |
|  | off budget | 20% | 30 MB |

Figure 4b 420

| Resource Set Type | Associated Pool | Priority | Processor Percentage | Interval | Memory Limit |
|---|---|---|---|---|---|
| 1 | A | 2 | 20% | 100 ms | 200 MB |
| 2 | B | 2 | 60% | 100 ms | 100 MB |
| 3 | B | 2 | 30% | 400 ms | 10 MB |
| 4 | B | 1 | 20% | 600 ms | 50 MB |
| 5 | C | 2 | 10% | 200 ms | 50 MB |
| 6 | C | 1 | 20% | 400 ms | 10 MB |
| 7 | D | 1 | 10% | 2000 ms | 10 MB |
| 8 | D | 1 | 10% | 1000 ms | 10 MB |

Figure 6a  600

```
namespace ExecutionModel
{ namespace PoolType
{
    enum Enum
    {
        Invalid = -1,
        External,
        Foreground,
        Background,
        BackgroundUX,
        VoipWorker,
        TurnByTurn,
        Pausing,
        Paused,
        Frozen,
        Max
    };
}

//
// Resources
// namespace ResourceType
{
    enum Enum
    {
        Invalid = -1,
        // Just examples..
        Cpu,
        CommitMemory,
        Speaker,
        Camera,
        Proximity,
        Max
    };
}
```

Figure 6b     600 - continued

```
// The priority at which a specific resource is acquired or requested.
namespace Priority
{
    enum Enum
    {
        // 1 through 100 are available for general use // NotAllowed means the client has no rights to the resource,
even if it is Free.
        NotAllowed = 101, // FromResourceSet means the caller (an external resource owner)
        // does not know the priority, and the
        // Resource Manager should calculate it based on the resource set
acquired
        // by the requesting process.
        FromResourceSet = 102,
    };
}

// Info about a resource that is being requested or has been acquired.
class ResourceInfo
{
    ResourceType::Enum resourcetype;
    DWORD dwAmount;
    Priority::Enum priority;
    bool fExclusive;

// Default constructor
    ResourceInfo() :
        resourcetype(ResourceType::Invalid),
        dwAmount(0),
        priority(Priority::NotAllowed),
        fExclusive(false)
    {
    }
};
```

Figure 6c    600 - continued

```
//
// Base Resource Sets
//

DECLARE_INTERFACE_(IBaseResourceSetCallback, IUnknown)
{
    STDMETHOD(OnRelease)() PURE;
    STDMETHOD(OnAcquired)() PURE;
    STDMETHOD(OnHold)() PURE;
    STDMETHOD(OnUnHold)() PURE;
};

namespace BaseResourceSetState
{
    enum Enum
    {
        // The resource has not been acquired yet.  The client is
waiting for it.
        Pending, // The resource has been acquired.
        Acquired, // The resource has been acquired, but the client should not
actively use it (e.g. audio)
        Hold
    };
} class BaseResourceSet
{
  public:
    HRESULT AcquireResources(
        // Size of rgRequests array
        __in SIZE_T cRequests, // Array of ResourceInfos, each including a resource type,
amount,
        // priority, and exclusivity bit.
        __in ResourceInfo* rgRequests, // The priority of the request, i.e., the order in which the
PoolManager
        // will attempt to satisfy pending requests.
        __in Priority::Enum priority, // The callback to receive Release/Acquired notifications
        __in IBaseResourceSetCallback* pCallback, // The process on whose behalf the resource is being acquired.
        __in DWORD pidRequesting,
```

Figure 6d     600 - continued

```
        // Data that is passed back that is only meaningful to the
client.
        __in PVOID pvAdditionalData, //  True if the resources are not acquired right away.
        __out bool *pfPending, // Returned handle to the resources or the pending request.
        __out BaseResourceSet* pBaseResourceSet);

HRESULT ReleaseResources(
        BaseResourceSet* pBaseResourceSet);

BOOL IsReleased();

private:

ce::list<BaseResourceSet*> m_pChildren;
    BaseResourceSet* m_pParent;

// The array of resources acquired or requested
    ResourceInfo m_rgri[ResourceType::Max];

// The state of the resource set
    BaseResourceSetState::Enum state;

// Whether a OnRelease has been sent.
    bool m_fReleased;

// The priority at which we check if this pending request
    // can be satisfied, when resources become available.
    Priority::Enum m_priority;

// The process that has acquired or requested these resources.
    DWORD pid;
};
```

Figure 6e    600 - continued

```
//
// Resource Sets
// namespace ResourceSetType
{
    enum Enum
    {
        Child, // Caller fills in the ResourceSetInfo values manually.
        UiForeground,
        OpportunisticGenericBackgroundAgent,
        GenericBackgroundAgent,
        BackgroundWorker,
        BackgroundAudioPlayer,
        BackgroundAudioPlayerPausing,
        VoipInCall,
        VoipWorker,
        TurnByTurn,
        UiPausing,
        UiPaused,
        UiFrozen,
        Max    };
}

DECLARE_INTERFACE_(IResourceSetCallback, IUnknown)
{
    STDMETHOD(OnRelease)() PURE;
    STDMETHOD(OnAcquired)() PURE;
};

class ResourceSetInfo
{
  public:
    // Constructor will set the remaining fields based on the
resourcesettype,
    // using the ResourceSetPolicyTable, (unless the type is Child).
    ResourceSetInfo(
        ResourceSetType::Enum resourcesettype);

// The type of resource set
    ResourceSetType::Enum m_resourcesettype;
```

Figure 6f    600 - continued

```
    PoolType::Enum m_pooltype;

// The value passed to ::SetPriorityClass()
    DWORD m_dwPriorityClass;

// Whether the CPU percentage is a hard maximum.
    BOOL m_fHardCpuLimit;

// The max amount this resource set can borrow from the
foreground.
    DWORD m_dwMaxCpuLoan;

// The max amount the process can commit before a warning is sent.
    DWORD m_cbCommitMemoryWarning;

// The resources that are part of this set.
    ResourceInfo m_riCpu;
    ResourceInfo m_riCommitMemory;

// The rights this resource set has to acquire external resources,
and at what priorities.
    Priority::Enum m_rgPriority[ResourceType::Max];
};

class ResourceSet : public BaseResourceSet
{
  public:
    // Get information about this resource set.
    void GetResourceSetInfo(
        __out ResourceSetInfo* pResourceSetInfo) const;

// Apply the resource set to the specified process.
    HRESULT Apply(DWORD pid);

private:
    ResourceSetInfo m_rsi;
};
```

Figure 6g     600 - continued

```cpp
//
// External Resource Sets
//

// The additional information attached to a BaseResourceSetInfo for an
external resource.
class ExternalResourceSet : public BaseResourceSet
{
  private:
    // A context cookie that is only meaningful to the client.
    PVOID m_pvContext;

// The event used to send notifications to the owner that a
message is waiting.
    HANDLE m_hEvent;
};

// The types of notifications that can be sent to an owner.
namespace ExternalResourceNotificationType
{
    enum Enum
    {
        // The formerly pending resource is now acquired
        OnAcquired, // Please release the resource.
        Release, // Temporarily stop using the resource, but you do not need to
Release it.
        OnHold, // The Hold state has ended.
        OnUnHold,
    };
}

// A handle to a resource or a pending resource request.
DECLARE_HANDLE(ResourceHandle);

// The data passed in the WNF notification
struct ExternalResourceNotification
{
    ResourceHandle h;
    ExternalResourceNotificationType::Enum type;
    ResourceType::Enum resourcetype; // identifies the specific
resource that an OnHold/OnUnHold notification applies to
    PVOID pvContextData; // the context cookie passed to
RmAcquireResource
};
```

Figure 6h     600 - continued

```
//
// The Resource Manager
// class ResourceManager : public IUnknown
{
    // Called by Execution Manager to create the singleton instance.
  public:
    static HRESULT CreateInstance(
        __in IExecutionManager* pExecManager,
        __in IForegroundTaskManagerServer* pForegroundTaskManager,
        __out CComPtr<ResourceManager>& pResourceManager);

//
    // Resource set APIs
    //

HRESULT AcquireResourceSet(
        __in const ResourceSetInfo& resourcesetinfo, // The callback for Release/Acquired notifications
        __in IResourceSetCallback* pCallback, // Who to take the resources from.
        __in_opt ResourceSet* pParentResourceSet, // The returned resource set
        __out ResourceSet** ppResourceSet);

HRESULT AcquireResourceSet(
        // The type of resource set
        __in  ResourceSetType::Enum resourcesettype, // The callback for Release/Acquired notifications
        __in IResourceSetCallback* pCallback, // Pass in NULL if the caller would rather the call
immediately fail
        // if the resources are not immediately available.
        // Otherwise, *pfPending == true if the resources are not
acquired
        // immediately and the returned pResourceSet is in the Pending
state.
        __out_opt bool *pfPending, // The returned resource set
        __out ResourceSet** ppResourceSet)
    {
        // Get the info for the requested type from the Resource Set
Policy Pool
        ResourceSetInfo rsi(resourcesettype);

// Request the resources from the appropriate pool
        return AcquireResourceSet(rsi, pCallback,
(ResourceSet*)m_rgpPool[rsi.m_pooltype], ppResourceSet);
    }
```

Figure 6i
600 - continued

```
    HRESULT ReleaseResourceSet(
            __in ResourceSet* pResourceSet);

//
    // External Resource APIs
    //

// Called once (probably during boot time) to register a resource
with
    // the Resource Manager.  This tells the Resource Manager how
much/many
    // of the resource is available (most likely due to hardware
capabilities).
    // The Resource Manager adds the resource to its free pool.

HRESULT RmRegisterResource(
        // The type of resource
        __in ResourceType::Enum resourcetype, // How much/many of the resource.
        __in DWORD dwAmount, // Whether the resource is shareable.
        // If  true, dwAmount is ignored.  Only useful with resources
        // that can also be acquired in exclusive mode.
        __in bool fShareable);

// Called to check whether an owner has the right to hand
    // out resources to pidRequesting.
    // RmAccessCheck will look up the resource set applied to
pidRequesting
    // and check if it has the right to the resources. (Amount and
priority
    // are assumed to be 1.)
    // RmAccessCheck is the replacement for CeProcessPolicyCheck.
    //
    HRESULT RmAccessCheck(
        // The type of resource.
          __in ResourceType::Enum resourcetype, // The process on whose behalf  the resource is being
acquired.
          __in DWORD pidRequesting);
```

Figure 6j    600 - continued

```
    // Called to check whether an owner has the right to hand
    // out resources to pidRequesting and whether they are actually
available.
    // RmAvailabilityCheck will first do an RmAccessCheck.  If that
passes,
    // it will ask the Base Resource Set Manager if the resources are
available in the
    // External pool.  If the Base Resource Set Manager finds that all
the resources are
    // immediately available, it will immediately return success.
    // If not, then next it will see if the resources
    // have been acquired at a lower priority.
    // You can think of RmAvailabilityCheck as essentially an
RmAcquireResources
    // that doesn't actually acquire the resources.
    //
    HRESULT RmAvailabilityCheck( // Size of rgRequests
        __in SIZE_T cRequests, // Array of ResourceRequests, each including a resource type,
amount,
        // priority, and exclusivity bit.
        // (If the priority is Priority::FromResourceSet, the
        // Resource Manager should lookup the priority based on the
resource
        // set that has been acquired by pidRequesting (e.g. is it the
foreground
        // resource set?))
        __in ResourceInfo* rgRequests, // The priority of the request, i.e., the order in which the
External
        // Resource Manager will attempt to satisfy pending requests.
        __in Priority::Enum priority, // The process on whose behalf  the resource is being
acquired.
        __in DWORD pidRequesting);

// Called by an owner (e.g. a service) to acquire the right to
hand
    // out resources to pidRequesting.
    // RmAcquireResources will first do the equivalent of an
RmAvailabilityCheck.
    // If the resources are immediately available, it will return
success.
```

Figure 6k    600 - continued

```
    // If resources need to be forcibly released, it will call
    // IBaseResourceSetCallback::OnRelease, and the External Resource
Manager
    // will turn around and send an
ExternalResourceNotificationType::Release notification
    // to the lower priority process
    // (or processes, if more than one is necessary to satisfy the
    // requested amount) and return *pfPending==TRUE.
    // If a shareable resource is requested in exclusive mode, the
Base Resource Set Manager
    // will call IBaseResourceSetCallback::OnHold and the External
Resource Manager
    // will turn around and
    // send an ExternalResourceNotificationType::Hold to everyone who
    // acquired that resource (in non-exclusive mode).
    // When the owner finally calls RmReleaseResource, then the
Resource Manager
    // will see that the pending request can be satisfied, so it will
    // send an ExternalResourceNotificationType::Acquired, telling the
owner
    // that the handle is now valid.  (The owner does not need to call
    // RmAcquireResource again.)
    //
    // If RmAcquireResources fails, the owner cannot hand out the
resource.
    //

HRESULT RmAcquireResources(
        // Size of rgRequests
        __in SIZE_T cRequests, // Array of ResourceRequests, each including a resource type,
amount,
        // priority, and exclusivity bit.
        // (If the priority is Priority::FromResourceSet, the
        // Resource Manager should lookup the priority based on the
resource
        // set that has been acquired by pidRequesting (e.g. is it the
foreground
        // resource set?))
        __in ResourceInfo* rgRequests, // The priority of the request, i.e., the order in which the
External
        // Resource Manager will attempt to satisfy pending requests.
        __in Priority::Enum priority,
```

Figure 6I    600 - continued

```
        // The process on whose behalf the server the resource is
being acquired.
        __in DWORD pidRequesting, // Data that is passed back in the notification that is only
meaningful to
        // the owner.
        __in PVOID pvContextData, // The event to signal when there is a notification waiting
        __in HANDLE hEvent, //  True if the resources are not acquired right away.
        __out bool *pfPending, // Returned handle to the resources or the pending request.
        __out ResourceHandle* ph);

// Called by an owner to release a resource (or pending request)
    // acquired via RmAcquireResources.
    // The Resource Manager will not send a revocation notification
because either:
    //   The owner already received the revocation and is calling
RmReleaseResource
    //      in response just to clean up the handle, or
    //   The owner is proactively calling RmReleaseResource, so it
already knows the
    //      resource has been released.
    HRESULT RmReleaseResources(
        ResourceHandle h);

protected:
     ResourceManager();
     ~ResourceManager();

private:
    // All the resources in the system, divided into pools.
    BaseResourceSet* m_rgpPool[PoolType::Max];

};

} // namespace
```

| Resource Set Type | Pool | RST Priority | CPU Priority | CPU Amount | Commit Memory Priority | Commit Memory Amount | Camera Priority | Speaker Priority | CPU Loan | Hard CPU Limit | Commit Memory Warning | Killable? | Priority Class |
|---|---|---|---|---|---|---|---|---|---|---|---|---|---|
| Foreground | FG | 1 | 1 | 70 | 1 | 110 | 1 | 1 | 0 | no | 95 | no | NORMAL_PRIORITY_CLASS |
| Opportunistic Background | FG | 2 | 2 | 10 | 2 | 10 | none | none | 0 | no | 8 | no | PROCESS_MODE_BACKGROUND_BEGIN |
| VoIP Comm Agent | FG | 1 | 1 | 50 | 1 | 40 | none | none | 50 | no | 30 | no | NORMAL_PRIORITY_CLASS |
| General BG Agent | BG | 2 | 2 | 10 | 2 | 10 | none | none | 0 | no | 8 | no | PROCESS_MODE_BACKGROUND_BEGIN |
| GBA (Debugging) | BG | 2 | 2 | 10 | 2 | 50 | none | none | 0 | no | 50 | no | PROCESS_MODE_BACKGROUND_BEGIN |
| BG Worker | BG | 1 | 1 | 10 | 1 | 10 | none | none | 0 | no | 8 | no | PROCESS_MODE_BACKGROUND_BEGIN |
| VoIP Active Agent | BG UX | 1 | 1 | 20 | 1 | 40 | none | 1 | 10 | no | 30 | no | ABOVE_NORMAL_PRIORITY_CLASS |
| Background Audio Proc. | BG UX | 2 | 2 | 10 | 2 | 10 | none | 2 | 0 | no | 8 | no | NORMAL_PRIORITY_CLASS |
| VoIP Worker | VoIP Worker | 1 | 1 | 10 | 1 | 40 | none | none | 10 | no | 8 | no | NORMAL_PRIORITY_CLASS |
| TBT | TBT | 1 | 1 | 20 | 1 | 40 | none | 1 | 20 | no | 30 | no | NORMAL_PRIORITY_CLASS |
| BAP Pausing | Pausing | 2 | 2 | 5 | 2 | 10 | none | none | 0 | no | 8 | no | NORMAL_PRIORITY_CLASS |
| Pausing | Pausing | 1 | 1 | 10 | 1 | 110 | none | none | 10 | no | 95 | no | NORMAL_PRIORITY_CLASS |
| Paused | Paused | 1 | 1 | 0.17 | 1 | 110 | none | none | 0.17 | yes | 95 | yes | NORMAL_PRIORITY_CLASS |
| Frozen | Frozen | 1 | 1 | 0 | 1 | 110 | none | none | 0 | yes | 95 | yes | NORMAL_PRIORITY_CLASS |
| System | System | 1 | 1 | 10 | 1 | 160 | n/a | n/a | 0 | no | n/a | no | n/a |

| Pool | CPU Amount | Commit Memory Amount |
|---|---|---|
| Foreground (FG) | 70 | 110 |
| Background (BG) | 10 | 10 |
| Background UX (BG UX) | 20 | 40 |
| VoIP Worker | 10 | 40 |
| TBT | 20 | 40 |
| Pausing | 10 | 110 |
| Paused | 0.17 | 0 |
| Frozen | 0 | 0 |
| System | 10 | 160 |

Figure 11    1100

```
// The constructor will fill in default values.
ResourceSetInfo rsi(ResourceSetType::Child);
rsi.m_dwCpuReserve = 15;
rsi.m_cbMemoryLimit = 8 * 1024 * 1024;
pResourceManager->AcquireResourceSet(
    rsi,
    pCallback,
    pParentForegroundResourceSet,
    &pResourceSetChild);
```

Figure 12    1200

```
HRESULT RmRegisterResource(
    // The type of resource
    __in ResourceType::Enum resourcetype, // How much/many of the resource.
    __in DWORD dwAmount, // Whether the resource is shareable.
    // If  true, dwAmount is ignored.  Only useful with resources
    // that can also be acquired in exclusive mode.
    __in bool fShareable);
```

Figure 13    1300

```
    STDMETHOD(RmRegisterResource)(
        // The type of resource
        __in ResourceType::Enum resourcetype, // How much/many of the resource.
        __in DWORD dwAmount, // Whether the resource is shareable.
        // If  true, dwAmount is ignored.  Only useful with resources
        // that can also be acquired in exclusive mode.
        __in bool fShareable) PURE;
```

Figure 14    1400
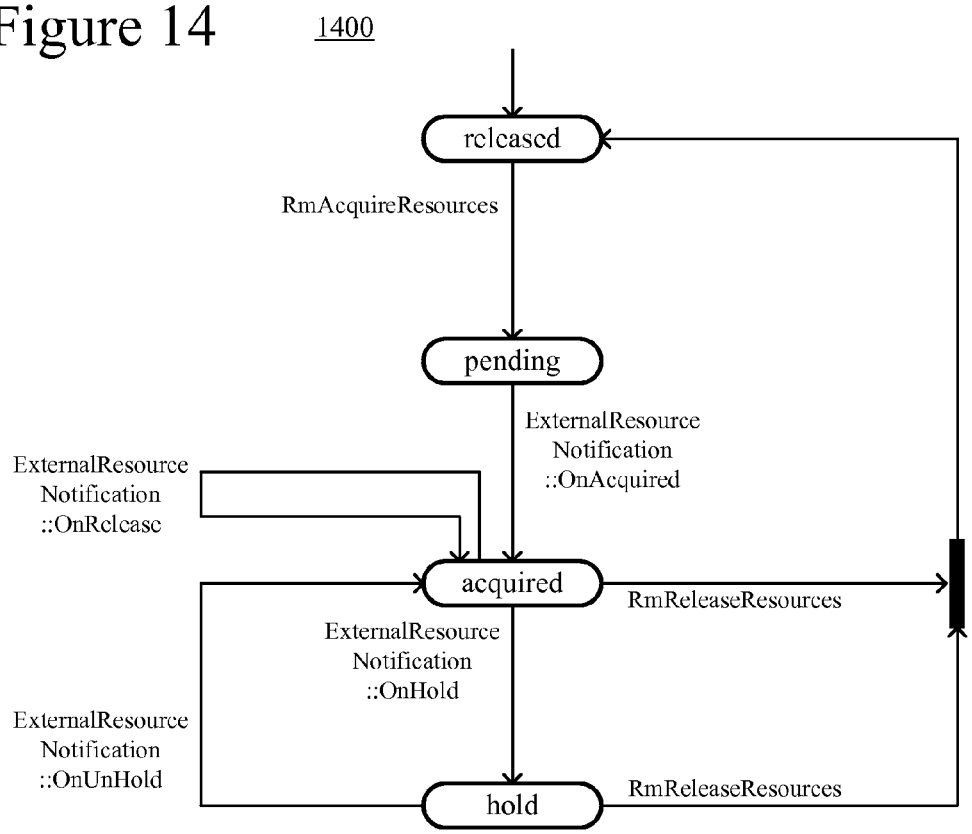
Figure 17    1700
```
ResourceNotification ern;
ern.m_h = h;
ern.m_type = ExternalResourceNotificationType::Release;
RtlPublishWnfStateData(
          resourcehandleinfo.m_wnfStateName,
          /* PWNF_TYPE_ID */NULL,
          &ern,
          sizeof(ern),
          /* scope */ NULL);
```

Figure 15     1500

```
    HRESULT RmAcquireResources(

// Size of rgRequests
        __in SIZE_T cRequests,

// Array of ResourceRequests, each including a resource
type, amount,
        // priority, and exclusivity bit.
        // (If the priority is Priority::FromResourceSet, the
        // Resource Manager should lookup the priority based on the
resource
        // set that has been acquired by pidRequesting (e.g. is it
the foreground
        // resource set?))
        __in ResourceInfo* rgRequests, // The priority of the request, i.e., the order in which
the External
        // Resource Manager will attempt to satisfy pending
requests.
        __in Priority::Enum priority;

// The process on whose behalf the server the resource is
being acquired.
        __in DWORD pidRequesting, // Data that is passed back in the notification that is
only meaningful to
        // the owner.
        __in PVOID pvContextData, // The event to signal when there is a notification waiting
        __in HANDLE hEvent, //  True if the resources are not acquired right away.
        __out bool *pfPending, // Returned handle to the resources or the pending request.
        __out ResourceHandle* ph);
```

QUOTA-BASED RESOURCE MANAGEMENT

BACKGROUND

A smartphone or other mobile computing device has limited resources but is expected to run multiple kinds of software concurrently. In addition to software processes for an operating system, the mobile computing device may be expected to run various combinations of applications at the same time, e.g., different combinations of a turn-by-turn map navigation application, a Web browser, a text messaging application, a voice communication application, an audio playback application, an email reader, calendar application, alarm clock application and/or game.

An application or system process can be considered a workload for the mobile computing device. With limited resources, the mobile computing device decides how to allocate resources such as processor utilization and memory to different workloads. In doing so, the mobile computing device can have competing goals—run as many of the workloads as possible, but provide sufficient resources for each of the workloads. For example, a mobile computing device may attempt to run a turn-by-turn map navigation application in the background while a user is actively using a different application in the foreground, which requires the mobile computing device to allocate sufficient resources so that each application has acceptable performance. If insufficient resources are allocated to a workload, the user may notice degradation in performance for that workload.

In some previous mobile computing devices, an application author or user was essentially free to use the resources of a device with few limits. As a result, a misbehaving application or user who started too many concurrent workloads could cause the performance of the mobile computing device to degrade unacceptably. This could be especially noticeable for the application in the foreground. If an operating system divides resources roughly equally between workloads, the operating system typically tracks the workloads and makes sure that each gets some processor resources and some memory. When there are not enough resources, the performance of applications typically suffers. Some applications may run fine, but others may run slowly or unpredictably, or fail entirely. This problem is especially acute for low-end devices with fewer resources.

SUMMARY

In summary, the detailed description is directed to innovations for quota-based resource management. For example, the quota-based resource management is implemented as part of an application layer framework and/or operating system of a mobile computing device. With the quota-based resource management, a budget can be established at design time for the resources of a mobile computing device, where each type of workload primarily draws from resources dedicated to that type of workload in the budget, as enforced by the operating system. The resources that are managed typically include processor and/or memory resources, but can also include a camera, audio speaker, microphone, other part of a media pipeline, near-field communication ("NFC") sensor or any other system-wide resource. This can help provide acceptable performance for those workloads that are permitted to run, while preventing resources of the mobile computing device from becoming "spread too thin" among workloads.

Quota-based resource management can also help maintain a good overall balance among different types of workloads. For example, more resources can be allocated to foreground tasks with which the user directly interacts, whereas fewer resources are allocated to background tasks. In example implementations, this allows a computing device to successfully run background tasks (e.g., sync email in the background, download files in an unobtrusive manner, and so on) while the user is working with another application in the foreground. At the same time, quota-based resource management provides an experience that aligns with the user's priorities. For example, while the user is playing a game, the game is not degraded by ongoing email synchronization, yet email synchronization continues so that when the game is done emails are up-to-date.

According to one aspect of the innovations described herein, a resource manager receives a request (e.g., from a task manager) for a resource set that is to be applied from one of multiple pools of resources. Each of the pools is associated with a different workload type. The pools at least in part specify a budget of resources of a computing device among the different workload types, respectively. A data store on the computing device can store pool information that defines the pools for the different workload types. For example, for each of multiple pools, the data store includes a processor use limit and a memory limit for the pool.

The types of pools (and associated workload types) depend on implementation. For example, the multiple pools include a first pool associated with a system workload type, a second pool associated with a foreground workload type, a third pool associated with a background user experience ("UX") workload type, and a fourth pool associated with a background processing workload type. The multiple pools can further include one or more pools each associated with a workload type for a specific class of applications (e.g., voice over internet protocol ("VoIP"), turn-by-turn ("TBT") navigation) and/or one or more pools each associated with a workload type for a non-active state for applications (e.g., for applications that are in the course of pausing, or are paused, or are frozen).

The requested resource set can have a resource set type selected from among multiple resource set types. In general, resource set type information specifies features of the resource set types. For example, for each of multiple resource set types, resource set type information specifies (a) one or more resource quotas each including an amount value for a resource type, (b) a pool identifier that indicates one of the pools, and (c) one or more priority values each indicating a priority for the resource set type within the indicated pool. A data store on the computing device can store the resource set type information.

The resource manager evaluates the request based at least in part upon the budget, and sends a reply to the request. For example, to evaluate the request, the resource manager can select a pool based upon a pool identifier for a resource set type of the requested resource set, then determine whether sufficient resources are free within the selected pool. To determine whether sufficient resources are free, the resource manager can consider currently available resources in the selected pool and resource quota(s) for the resource set type of the requested resource set. If sufficient resources are not free, the resource manager can determine whether a previous resource set applied from the selected pool has priority lower than the resource set type of the requested resource set and, if so, request release of the previous resource set.

According to another aspect of the innovations described herein, a task manager selects a resource set type from among multiple resource set types associated with multiple pools of resources, where each of the pools is associated with a different workload type. The pools at least in part specify a budget of resources of the computing device among the different workload types. The task manager sends a request for a resource set of the selected resource set type and receives a reply to the request. Resource set type information (as described above) can specify features of the resource set types.

In some implementations, the task manager receives a request to execute a task (from a client) and, in response, selects a resource set type and sends a request for a resource set to a resource manager. Depending on the reply to the request for the resource set, the task manager can take different actions. For example, if the reply is an acceptance, the task manager can launch the task and apply the resource set to the task. Or, if the reply is a refusal, the task manager can put the request for the resource set in a queue for later processing (e.g., repeating the request to the resource manager). Or, if the reply is an indication that the request for the resource set is pending, the task manager can, upon notification of the release of resources, launch the task and apply the resource set to the task. In any case, the operating system can enforce the budget of resources for the task according to the selected resource set type.

According to another aspect of the innovations described herein, a mobile computing device includes a processor and memory that stores budget information adapted to resources of the mobile computing device. In particular, the budget information includes pool information for multiple pools of resources and resource set type information for multiple resource set types. Each of the multiple pools is associated with a different workload type, and the pools at least in part specify a budget of resources of the mobile computing device among the different workload types, respectively. The pool information includes, for each of the pools, (a) a memory limit for the different workload type associated with the pool, and (b) a processor use limit for the different workload type associated with the pool. For each of the multiple resource set types, the resource set type information includes (a) one or more resource quotas, (b) a pool identifier that indicates one of the pools, and (c) one or more priority values.

The foregoing and other objects, features, and advantages of the invention will become more apparent from the following detailed description, which proceeds with reference to the accompanying figures.

BRIEF DESCRIPTION OF THE DRAWINGS

FIGS. 1 and 2 are flowcharts illustrating generalized techniques for quota-based resource management from the perspective of a task manager and a resource manager, respectively.

FIGS. 4a and 4b are tables showing examples of pool information and resource set type information, respectively.

FIGS. 6a-6l show pseudocode listings for type values and interfaces for quota-based resource management in the example implementations.

FIG. 7 is an example table showing resource set type information in the example implementations.

FIG. 8 is an example table showing pool information in the example implementations.

FIGS. 9 and 14 are state diagrams illustrating state transitions for states of a resource set and external resource, respectively, in the example implementations.

FIGS. 11-13, 15 and 17 are pseudocode listings illustrating aspects of quota-based resource management in the example implementations.

DETAILED DESCRIPTION

Figure 3:
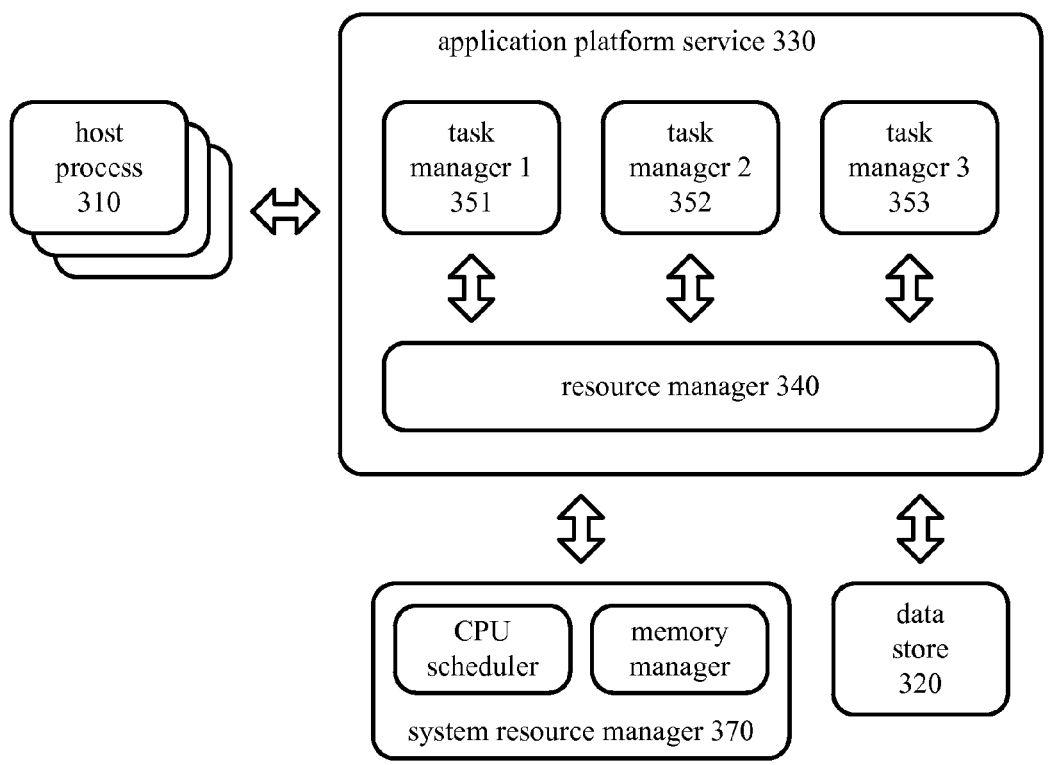
FIG. 3 is a diagram showing a generalized software architecture for quota-based resource management.

Innovations for quota-based resource management are described herein. For the quota-based resource management, a budget is established for the resources of a computing device such as a smartphone. During operation, a workload primarily uses resources defined by that budget, and the budget is enforced by the operating system.

In general, for the quota-based resource management, resources of the computing device (such as processor and/or memory resources, but also potentially including a camera, audio speaker, microphone, other part of a media pipeline, NFC sensor or any other system-wide resource) are divided into pools. One pool can be dedicated to each type of workload. For example, one pool includes resources for foreground user experiences (e.g., applications in the foreground of the user interface ("UI") of the computing device), another pool includes resources for system processes, another pool includes resources for turn-by-turn ("TBT") navigation in the background, and so on. In this way, the resources of the computing device are budgeted for the various types of workloads, which can help maintain a good overall balance among different types of workloads. For example, more resources can be allocated to foreground tasks while fewer resources are allocated to background tasks, in order to allow a computing device to run background tasks well while the user is interacting with another application in the foreground. At the same time, quota-based resource management can provide an experience that aligns with the user's priorities.

In general, a resource set is a grouping of resources that a client can request for a workload to use. A resource can be one or more processors, memory, a camera, a speaker for audio output, a microphone for audio capture, a proximity sensor (e.g., for NFC), other sensor or any other component or service in the computing device, especially one for which there may be contention among multiple tasks or applications to acquire the resource. The resource set can indicate how much of various types of resources the workload is allowed to use, which pool the resources come from, the priority for the workload/resource set type, and other information about access to resources for the workload. The quota-based resource management for the computing device can indicate which workloads to start based on the budget specified in the pools and requested resource sets. In typical use situations, a workload can not be started until and unless the computing device has resources for it, which helps avoid situations in which the resources of the computing device are "spread too thin" among multiple workloads. The operating system enforces rules about resource utilization based on the resource sets that have been applied to workloads.

A data store (such as a registry or other repository of settings and information for the computing device) can store information about the pools and types of resource sets. In this way, the budget can be defined declaratively for the computing device. Abstracting the values of budget information (such as pool information and resource set type information) from code for resource management provides a simple way to manage and update the values. Values of budget information in a data store can be updated or otherwise modified without changing code. And, in at least some cases, the same code can be reused on different classes of computing devices, with different values of the budget information being adapted to the respective classes of devices.

In some examples described herein, various operations for the quota-based resource management are performed by a task manager and resource manager of an application layer framework of the computing device. When a client (e.g., running task, process, or any other piece of code) wants to execute a new task as the result of a user action or otherwise, the client submits a request to a task manager appropriate for that type of task. The task manager asks the resource manager for a resource set that is appropriate for the type of task that is being requested.

The resource manager inspects the appropriate pool to see if the pool has enough resources to give for the requested resource set. If the pool does, the request is granted. If not, the resource manager can look for previous resource sets it has given out from the same pool that are of lower priority. If the requested resources are available in lower priority resource sets, the workloads for those lower priority resource sets can be asked to release their resources. Thus, higher priority workloads can potentially stop the execution of lower priority ones. Since this release operation may take time (not be synchronous), the client can be told that the resources are pending, and be notified later when the resources become available. If resources for the requested resource set are held by equal or higher priority resource sets, the client can similarly be told that the request for the resource set is pending, and the client waits until resources are voluntarily released. Thus, if the task manager cannot acquire a resource set, the task manager can handle the situation in different ways, e.g., by failing the call from the client, or putting the request in a queue and satisfying it once the resource set becomes available.

Once a resource set is successfully acquired, the task manager can launch the task and apply the resource set to that task. The "apply" operation enforces the restrictions defined by the resource set. For example, the task is limited to an amount of memory defined in the resource set, and any memory allocation requests beyond that will fail. Or, the task has a processor quota such as 20% from the resource set, and once the task has used 20% of the processor cycles (over some interval, such as 600 ms), the task will not run again until the next interval (assuming another task, process, etc. seeks to use the processor). (In some implementations, the processor quota for a task can be set as a "soft limit," such that the task is allowed to continue to run if the system has unused processing cycles.) These processor and memory restrictions are enforced by the kernel of the operating system. Thus, the task manager/resource manager apply resource sets according to budget information and rules of the quota-based resource management, whereas the kernel provides lower level enforcement of processor restrictions, memory restrictions, other resource restrictions, etc. according to rules of the kernel and the applied resource sets.

In some implementations, for certain tasks, it is also possible to request a special resource set that does not come out of a fixed-size pool, and is therefore "off budget." This is useful for tasks that run immediately. Despite being off-budget, these resource sets are useful because they impose restrictions (such as processor and memory quotas) on a task, like any other resource set. Thus, short-lived workloads or workloads that use few resources can be allowed to run "off budget" but with their resources constrained.

Generally, techniques and tools described herein can be implemented with mobile computing devices or other computing devices. Tangible computer-readable media (e.g., computer program product, computer storage or other computer-readable memory) can store computer-executable instructions for causing a processor programmed thereby to perform one or more of the techniques described herein. The various techniques and tools can be used in combination or independently. Different embodiments implement one or more of the described techniques and tools. Some of the techniques and tools described herein solve one or more of the problems described in the Background section but techniques and tools described herein need not solve such problems.

I. Example Techniques for Quota-Based Resource Management

FIG. 1 shows a generalized technique (100) for quota-based resource management from the perspective of a task manager of a computing device. FIG. 2 shows a corresponding generalized technique (200) for quota-based resource management from the perspective of a resource manager of a computing device. The task manager and resource manager can be implemented as part of an application layer framework that interacts with the operating system of the computing device. Alternatively, the task manager and/or resource manager can be implemented as part of the operating system. Or, the task manager and/or resource manager can be implemented as part of another software layer. A computing device such as a mobile computing device can perform the technique (100) and/or the technique (200).

Figures 8, 9:
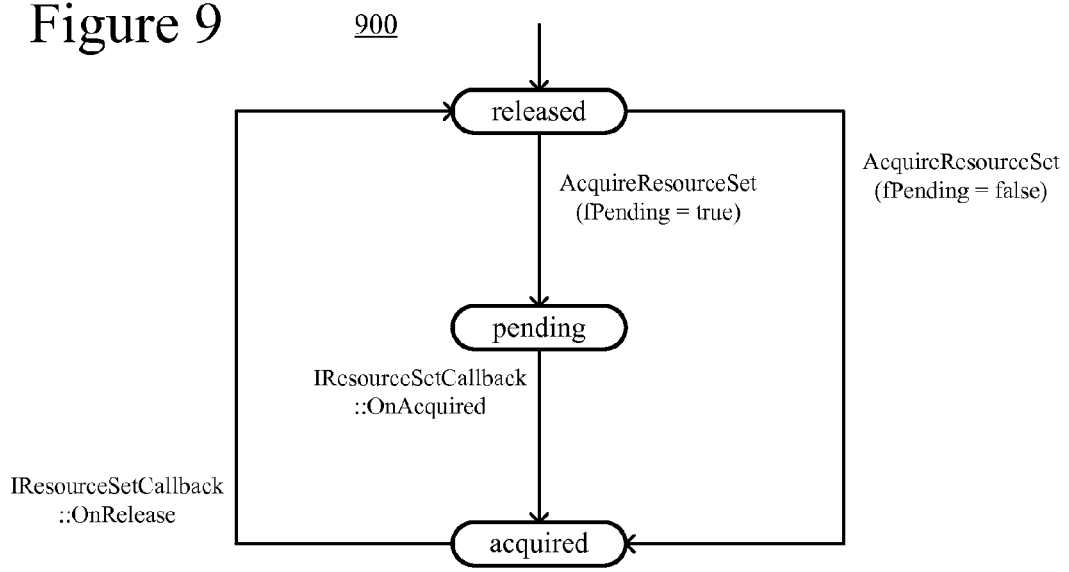

With reference to FIG. 1, to start, the task manager selects (110) a resource set type from among multiple resource set types associated with multiple pools of resources, where each of the pools is associated with a different workload type. Collectively, the pools at least in part specify a budget of resources of the computing device among the different workload types, respectively. The types of pools (and associated workload types) depend on implementation. In some implementations, the pools include a pool associated with a system workload type, a pool associated with a foreground workload type, a pool associated with a background user experience ("UX") workload type, and a pool associated with a background processing workload type. The pools can further include one or more pools each associated with a workload type for a specific class of applications (e.g., VoIP, TBT navigation) and/or one or more pools each associated with a workload type for a non-active state for applications (e.g., for applications that are in the course of pausing, or are paused, or are frozen). FIG. 4*a* shows a simplified example of pools associates with workload types for a class of computing device. FIG. 8 shows pools associates with workload types in example implementations. Alternatively, the pools include other and/or additional types of pools.

A data store on the computing device can store pool information that defines the pools for the different workload types. For example, for each pool of the multiple pools, the data store includes a processor use limit and a memory limit for the pool. The data store can also store resource set type information for the resource set types. For example, for each of the multiple resource set types, resource set type information specifies (a) one or more resource quotas, each including an amount value for a resource type such as processor or memory, (b) a pool identifier that indicates one of the multiple pools of resources, (c) one or more priority values, each indicating a priority for the resource set type within the indicated pool (e.g., a processor priority, a memory priority and/or an overall priority). FIG. 4*b* shows a simplified example of resource set type information for a class of computing device.

FIG. 7 shows values for resource set types in example implementations. Alternatively, the resource set types include other and/or additional resource set types.

Returning to FIG. 1, the task manager sends (120) a request for a resource set of the selected resource set type. The task manager can perform the selecting (110) and sending (120) in response to receiving a request to execute a task from a client.

With reference to FIG. 2, the resource manager receives (210) the request for a resource set that is to be applied from one of multiple pools of resources. The resource manager evaluates (220) the request based at least in part upon the budget. For example, the resource manager selects, from among the multiple pools, a pool that is appropriate for the requested resource set (e.g., based upon a pool identifier for the resource set type of the requested resource set). The resource manager also determines whether sufficient resources are free within the selected pool (e.g., based upon currently available resources in the selected pool and resource quota(s) for the requested resource set). If sufficient resources are not free within the selected pool, the resource manager can determine whether a previous resource set applied from the selected pool has lower priority than the requested resource set and, if so, request release of the previous resource set.

The resource manager sends (230) a reply to the request. The task manager receives (130) the reply to the request for the resource set and processes the reply. For example, if the reply is an acceptance, the task manager can launch a requested task and apply the resource set to the task. Or, if the reply is a refusal, the task manager can put the request for the resource set in a queue for later processing. Or, if the reply is an indication that the request for the resource set is pending release of resources, the task manager can, upon notification of the release of resources, launch the task and apply the resource set to the task. After the task is launched and the resource set is applied to the task, the operating system enforces the budget of resources for the task according to the selected resource set type.

Figure 10A:
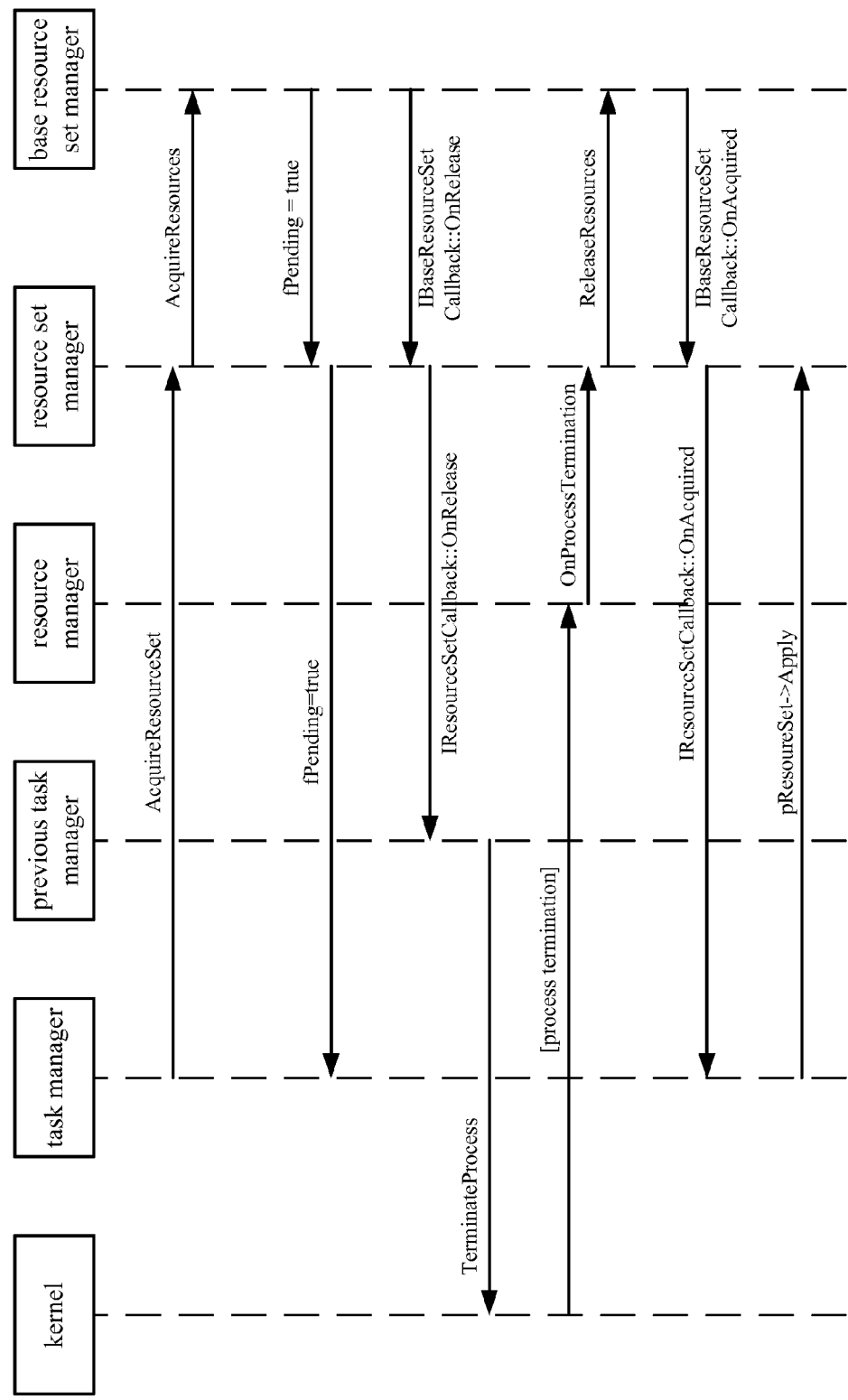
FIGS. 10a, 10b and 16 are sequence diagrams illustrating examples of resource acquisition in the example implementations.
Figure 10B:
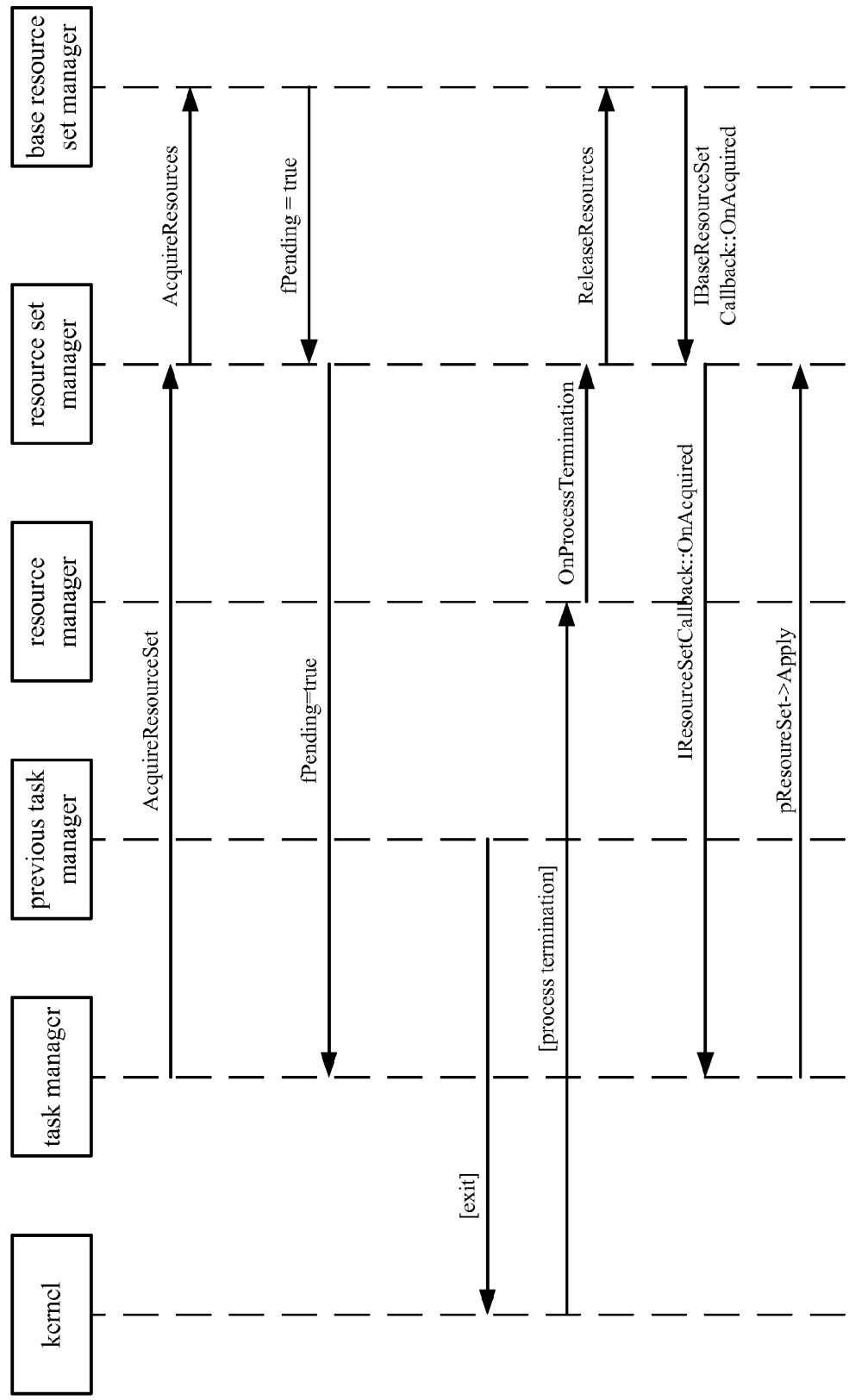
Figure 16:
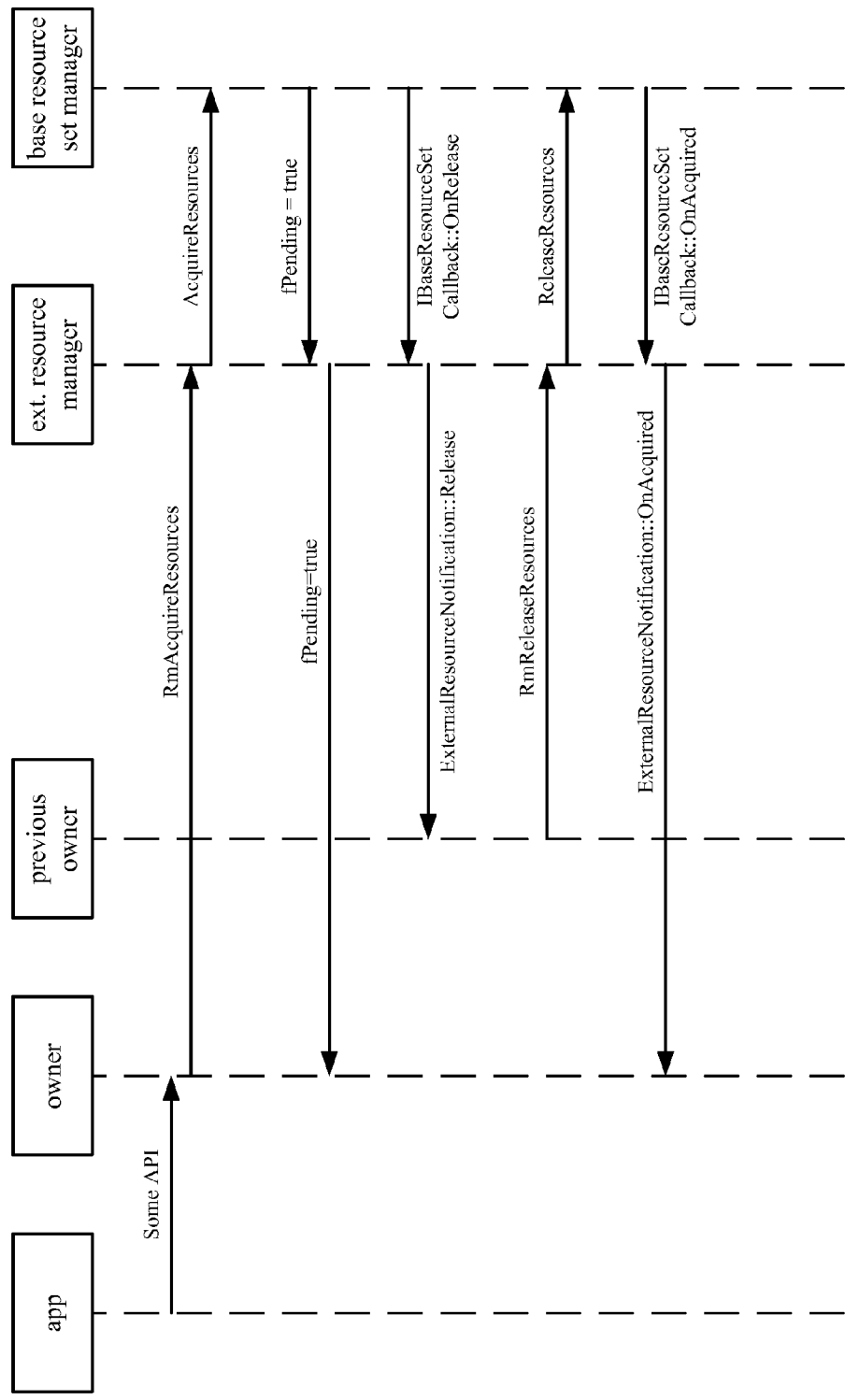

FIGS. 10a, 10b and 16 show examples of call sequences in which resources of resource sets are acquired in example implementations. The call sequences use interfaces, methods, data types, etc. illustrated in FIGS. 6a-6l. In parts, these examples include detailed ways of implementing the generalized techniques (100, 200) shown in FIGS. 1 and 2. Alternatively, the techniques (100, 200) are implemented in another way, e.g., using interfaces, methods and/or data types with different definitions and/or using different call sequences.

In the context of FIGS. 1 and 2, and as used elsewhere herein, the terms "send" and "receive" do not imply any limitation on the manner or mechanism of communication within the computing device. The "send" and "receive" operations can be implemented with a method call and synchronous return, method call and asynchronous return via callback interface, message passage or any other form of communication within the computing device. The content of the request, reply or other message that is conveyed from "sender" to "receiver" can be directly conveyed or processed through one or more intervening layers of code, potentially including processing that changes the type, structure, fields, etc. of the message, or converts the message to another form of message.

II. Example Software Architecture.

FIG. 3 shows a generalized software architecture (300) for quota-based resource management. The software architecture (300) can be implemented on a smartphone, handheld gaming device, other mobile computing device or other computing device. The software architecture (300) includes one or more host processes (310), an application platform service (330) with task managers (351, 352, 353) and a resource manager (340), a system resource manager (370) and a data store (320). In various examples described herein, the software architecture (300) works with various types of tasks, workloads and hosts, for resources budgeted into pools from which resource sets of resources are drawn.

Tasks, Workloads and Hosts

In general, a task is a logical unit of functionality for an application. An application can include one or more tasks. A task instance is a task that is being executed. A foreground task instance is a task instance capable of displaying UI, and a background task instance (or background agent) is a task that is not capable of displaying UI. In places, a task instances is called a running task, launched task or simply a task.

A host (or host process), such as a host process (310) in FIG. 3, is a process that contains one or more task instances of an application. A UI host is a host process that contains only task instances that display UI. A background host contains background agents. A system process is any process that is not a host process.

In general, a workload is a set of processes cooperating to provide functionality. The number of workload types, definitions of workload types and conditions for different workload types (e.g., types of hosts permitted in workload, count of hosts permitted in workload) depend on implementation. The workloads can be identified generically as workload A, workload B, workload C, etc. Or, workloads can be identified with labels that indicate a type of processing; e.g., a workload can be a system workload, foreground UI workload, background UX workload, background processing workload or other workload.

A system workload includes system processes. For example, a mobile computing device can include a single system workload that contains all system processes. The system workload provides functionality such as system-provided foreground UI features for a lock screen, application bar, managing incoming phone calls, alarms, reminders, etc. The system workload can also provide functionality for audio playback by system resources, email synchronization, downloading/installing updates and applications, etc. In some implementations, system processes in the system workload may do work on behalf of host processes in other workloads (e.g., when a task instance in a host process in another workload makes a call to a service library of a system process).

A foreground UI workload includes a host process that provides a UI-based, visual UX. For example, a UI workload can contain an active UI host for current display of the foreground UI. Or, a UI workload can contain an inactive UI host for another session, or when the system workload is providing the foreground UI (e.g., for the lock screen).

A background UX workload includes a host process (background host) that provides a non-visual UX, such as background audio playback with a $3^{rd}$ party application, playback of audio directions from a TBT map navigation application, or using DLNA to provide video to an external display while switched to another application (e.g., email reader).

A background processing workload includes a host process (background host) that performs background processing such as updating a user's location to a server, downloading media when the screen is off, etc., on behalf of one or more applications. The background processing workload does not directly provide part of the UX.

Alternatively, the quota-based resource management uses other and/or additional types of workloads. Similarly, different implementations can have different rules about the number of hosts permitted in a workload, relations permitted between tasks for a given application to workloads, etc. In any case, the task managers (351, 352, 353) and resource manager (340) combine to provide quota-based resource management.

Pools, Resource Set Types and Data Store

The budget for a class of computing device can be established at design time based upon the resources of that class of computing device. Different classes of computing device typically have different budgets. For example, the budget for a high-end device with more memory, a faster processor, etc. is expected to be different than the budget for a low-end device. In any case, the budget can be at least in part specified with pools and resource set types.

A pool is a set of resources of the mobile computing device. At least some resources of the mobile computing device are divided into multiple pools. One pool can be dedicated to each workload type in order to set a resource budget for the respective workloads. In this way, the resources of the computing device can be budgeted for the various workload types. Aside from sharing of resources between pools under limited circumstances (described below) and other limited exceptions, a pool sets an upper limit on resources used for the associated workload. For example, processor usage and memory for the mobile computing device are split between multiple pools for workload A, workload B, workload C, and so on. Some portion of the resources can be reserved and not allocated to any pool, for use in "off budget" processing. Other resources (such as network connection bandwidth, camera) can be managed separately from the multiple pools, or as part of the pools.

A quota (or resource quota) is a combination of resource type and quota size or amount. For example, a quota can be a memory limit such as 10 MB or 40 MB for "commit memory" from which memory is allocated to tasks. Or, a quota can be a processor use limit, which can be expressed in terms of a percentage of processor use over an interval of time (e.g., 20%, 40%). The interval of time can be fixed or variable, in which case the processor use limit can affect both overall processor utilization and latency or responsiveness of the processor.

A resource set is a grouping of resources that can be used at the request of a client (host process, other code, etc.) to run a task in a workload. A resource can be one or more processors, memory, a camera, a network connection, a speaker for audio output, a microphone for audio capture, a proximity sensor, other sensor or any other component or service in the computing device. A resource set has a resource set type. A resource set type can include one or more resource quotas (e.g., for a processor use limit and a memory limit), a pool identifier for the pool from which resources are applied, one or more priority values and/or other information. Thus, a resource set type can define how many/much of each type of resource a task is allowed to use, which pool the resources come from, priority information and other information about access to resources the task will have.

In general, the data store (320) is a repository for settings about pools, resource set types and other budget information. For example, in some implementations, the data store can be a registry in which pools and resource set types are defined declaratively. Alternatively, the data store (320) is some other type of repository for settings and information about the device. The data store (320) can include a single data repository at one location or multiple data repositories at different locations. In various examples described herein, the data store (320) stores pool information for multiple pools of resources and resource set type information for multiple resource set types. For each of the pools, the pool information includes (a) a memory limit for the workload type associated with the given pool, and/or (b) a processor use limit for the workload type associated with the given pool. The resource set type information includes, for each of the multiple resource set types, (a) one or more resource quotas, each including an amount value for a resource type, (b) a pool identifier that indicates one of the multiple pools, and/or (c) one or more priority values, each indicating a priority for the resource set type within the indicated pool.

FIG. 4a shows a simplified example (400) of pool information for a class of mobile computing device. The pool information specifies four pools A, B, C and D that are associated with four different workload types, respectively. For each of the four pools A, B, C and D, a processor limit and memory limit are indicated. The memory limit is a "commit memory" limit consistent with available system memory on the mobile computing device. The pool information also includes a listing for "off budget" processing, which is expected to complete quickly and/or consume few resources. In any case, the off-budget processing has resource quotas associated with it to guard against excessive use of resources by off-budget processing. Different classes of mobile devices can have different pool information.

FIG. 4b shows a simplified example (420) of resource set type information for a class of mobile computing device. Different classes of mobile devices can have different resource set type information. For each resource set type, the resource set type information includes an associated pool, an overall priority for conflicts within the same pool, a processor utilization percentage over a specified interval, and a memory limit. For example, a resource set with resource set type 2 has higher priority than a resource set with type 4. A task manager (351, 352, 353)/resource manager (340) can pull resources back from the resource set with type 4 to apply for the resource set with type 2.

FIGS. 7 and 8 show more specific examples of pool information and resource set type information in example implementations. Alternatively, the pool information and/or resource set type information can include other and/or additional fields. Depending on implementation, the pool information can include other and/or additional pools, and the resource set type information can include other and/or additional resource set types. Typically, the pool information and/or resource set type information varies between classes of computing devices that have different resources.

Task Manager and Resource Manager

The application platform service (330) is an application layer framework or other layer of software that interacts with the system resource manager (370). The application platform service (330) can include multiple task managers for handling requests for different types of tasks. FIG. 3 shows three task managers (351, 352, 353). For example, the first task manager handles requests to launch foreground UI task instances, the second task manager handles requests to launch background task instances that contribute to background UX, and the third task manager handles requests to launch other background task instances. Alternatively, the quota-based resource management includes other and/or additional kinds of task managers.

In general, when a host process (310), piece of code or other client wants to execute a task (whether as the result of a user action or otherwise), the client submits the request to the task manager (351, 352 or 353) for that type of task. In some implementations, resources for system processes are not managed using quota-based resource management. Alternatively, however, resources for system processes can be managed along with resources for other processes. The task manager (351, 352 or 353) receives the request to execute a task (task instance) from the client, determines an appropriate resource set for the type of task, and requests the appropriate resource set from the resource manager (340).

The resource manager (340), in response to a request for a resource set from a task manager (351, 352 or 353), selects an appropriate pool (for workload type) and inspects the pool to determine if there are enough resources to satisfy the request. If so, the resource manager (340) grants the request and sends an acceptance to the task manager (351, 352 or 353). If not, the resource manager (340) can search for a previously applied resource set (that has not yet been released) that is within the selected pool and has a lower priority. If a lower priority resource set (or sets) in the selected pool has enough resources to satisfy the request, the resource manager (340) can ask for the lower priority resource set(s) to be released (through coordination with a task manager and/or execution manager to stop the task instance(s) using the lower priority resource set(s)). The resource manager (340) then sends an appropriate reply to the task manager (351, 352 or 353).

The task manager (351, 352 or 353) gets a response from the resource manager (340) and can respond to the client. When the response from the resource manager (340) indicates the request for the resource set has been accepted, the task manager (351, 352 or 353) can (as appropriate) launch the task and apply the resource set to the task. Thus, the task is launched using resources of the pool for the appropriate type of workload. Depending on the situation and the rules for launching tasks for the implementation, the new task instance can be launched as part of a new host in a new workload, launched as part of a new host in an existing workload, or launched as part of an existing host in an existing workload.

When the response indicates the request for the resource set has failed, the task manager (351, 352 or 353) can simply report that failure to the client, or the task manager can retry the request, depending on implementation of the task manager. When the response indicates the request for the resource set is pending (awaiting release of resources, which may take an arbitrarily long amount of time), the task manager (351, 352 or 353) can report that result to the client, and await notification that the resources have been released. Thus, even after the release of lower priority resources has been requested, the client may be told that the resources are "pending," and will be notified later when the resources become available. If the resources are held by equal or higher priority resource sets, the client can similarly be told that the resources are pending, and waits until those other resource sets are voluntarily released.

The system resource manager (370) enforces resource limits defined in resource sets for task instances. The system resource manager (370) can implemented at least in part with operating system components. For example, some parts of the system resource manager (370) can be provided by the kernel of the operating system. In FIG. 3, the system resource manager (370) includes a CPU scheduler and memory manager. Other parts of the system resource manager (370) such as a resource enforcer module (not shown in FIG. 3) can be implemented as part of the operating system or as part of the application platform service (330). Once a resource set is successfully acquired, the task manager (351, 352 or 353) can launch the task and apply the resource set to that task, at which point the system resource manager (370) enforces the restrictions defined by the resource set. For example, a task will be limited to the amount of commit memory defined in the resource set applied to the task, and any memory allocation requests beyond that will fail. Or, when the task has a processor quota of x %, once the task has used x % of the processor cycles over the applicable interval, the task will not run again until the next interval, at least if any other task, process, etc. seeks to use the processor. A flag in the resource set can indicate whether the task is allowed to use more than its processor quota if and when no other task, process, etc. seeks to use the processor.

For certain tasks, it is also possible to request a special "off budget" resource set that does not come out of a fixed-size pool. This is useful for tasks that run immediately. Despite being off budget, these resource sets are still useful because they impose restrictions (such as processor and memory quotas) on the task like any other resource set.

Figure 5:
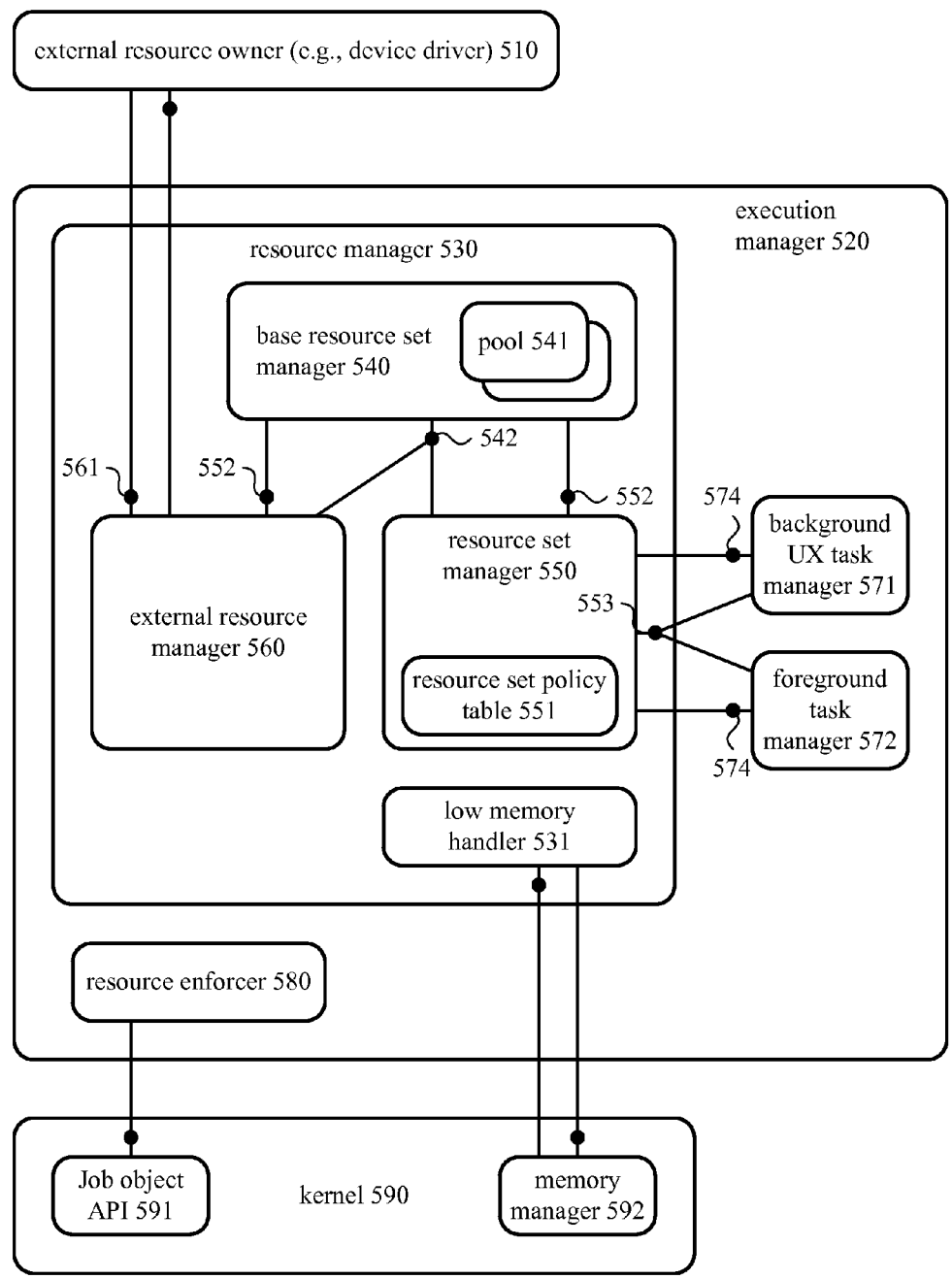
FIG. 5 is a diagram showing a software architecture for quota-based resource management in example implementations.

FIG. 5 shows a software architecture (500) that is a specific example of the generalized software architecture (300) of FIG. 3. The architecture (500) includes details about internal components of a resource manager (340) and interfaces between components in example implementations, with reference to interfaces, methods, data types, etc. illustrated in FIGS. 6a-6l. Alternatively, the generalized software architecture (300) is implemented in another way, e.g., using internal components, interfaces, methods and/or data types with different definitions. FIG. 3 shows layers of software. Alternatively, the software architecture (300) can include more or fewer layers. For example, a given layer can be split into multiple layers, or different layers can be combined into a single layer. Functionality described with reference to one layer (e.g., task management, resource management) can in some cases be implemented as part of another layer. Thus, the task managers and resource manager can reside in the same service (e.g., an application layer framework or other application platform service) or different services. The task managers and/or resource manager can be implemented as part of the operating system or another layer of software.

For the sake of simplicity, FIG. 3 does not show certain components and services found in typical implementations, e.g., debugger, package manager, background notification services, background audio playback services, UI navigation model, execution manager, etc.

III. Example Scenarios for Combinations of Classes of Applications

Quota-based resource management can be used in various scenarios when managing the resources of a computing device. At design time, policies for scenarios are specified for classes of applications that may run in parallel on the computing device. The supported scenarios depend on resources of the computing device. The scenarios can be managed through policies reflected in pool information and resource set type information in a data store of the computing device.

A class is a category of applications with certain resource consumption patterns. For example, there may be different classes for foreground applications, VoIP applications in the background, TBT navigation in the background, electronic wallet applications in the background, media or file data syncing in the background, background processing for tile updating for tickers, etc., other types of background processing for syncing, audio playback in the background. In many cases, a given application (such as TBT) is treated as a foreground application when running in the foreground, but then classified as a type of background application when switched to the background, depending on the resources used for background processing. As reflected in resource set type information, different classes can be favored or disfavored. For example, the foreground can have higher resource limits (most processor utilization, higher memory limits) and higher priority access to resources, whereas data syncing applications have lower resource limits and are more delay insensitive.

A scenario is a combination of one or more classes of applications for which the mobile computing device supports execution in parallel. For example, scenarios can be specified for (a) only a foreground application, (b) a foreground application and a VoIP application (or TBT application, but not both) running concurrently, (c) a foreground application, VoIP application and TBT navigation application running concurrently, (d) a foreground application, VoIP application and multiple data syncing applications running concurrently, and so on. Different types of computing devices can have different sets of scenarios associated with them. For example, a low-end mobile computing device may support scenarios (a) and (b), while a high-end mobile computing device with more resources supports scenarios (a)-(d). Thus, the set of supported scenarios depends on the class of computing device.

The quota-based resource management implemented with the task manager and resource manager can be used to manage scenarios according to the applicable policies for pools and resource set types, as applied for a scenario. The task manager can enforce the policies for scenarios when selecting a resource set type for a request to execute a task. The task manager can also coordinate release of resources in a lower priority resource set in a manner consistent with the policies for different scenarios, to favor one class of application over another class of application that draws resources from the same pool. Or, different classes of applications can be associated with different pools, such that resources are reserved for the different classes of applications to run concurrently. Similarly, the resource manager can apply the policies for scenarios when evaluating a request for a resource set.

For example, at a low-end device, suppose a TBT navigation application is running in the foreground. When a VoIP call comes in and is answered (to launch the VoIP application), the TBT map navigation is terminated or switched to the background so that performance is not degraded. This can be implemented through resource set types that have different priorities but are associated with the same pool. This would be consistent with the foreground+VoIP scenario (and consistent with the absence of a scenario for foreground+VoIP+TBT). At design time, a decision can be made to manage this scenario consistently. Through selection of resource set types to use for a task, a task manager can enforce a policy that some classes of applications run in the foreground but never in the background, while other classes of applications can run in the foreground or background.

A task manager can queue tasks waiting for a particular type of resource, to control which classes of application (or how many instances of a given class of application) are allowed to run concurrently. For example, multiple data syncing applications may be run concurrently on a high-end device but serialized on a low-end device. This reserves resources for other applications and also helps ensure that any one of the data syncing applications, if launched, will have resources sufficient to run. In some scenarios, this can mean one application per class runs, and other applications in the class are serialized. Other scenarios, however, may permit multiple applications in a class running concurrently.

IV. Example Implementations for Quota-Based Resource Management.

FIGS. 5-17 illustrate specific features of example implementations of quota-based resource management. Alternatively, the quota-based resource management is implemented in another way, e.g., using a software architecture with different components and/or different organization, using interfaces, methods and/or data types with different definitions and/or using different call sequences.

FIG. 5 shows a software architecture (500) for the example implementations of quota-based resource management. Many of the modules in the software architecture (500) are generally described with reference to FIG. 3. FIG. 5 shows specific examples of some modules that are more generally described with reference to FIG. 3, including background UX task manager (571) and foreground task manager (572) as examples of task managers, and kernel (590) with memory manager (592) as an example of a system resource manager with memory manager. FIG. 5 shows two task managers—background UX task manager (571) and foreground task manager (572). The architecture (500) can include other types of task managers. FIG. 5 also shows additional modules, such as the execution manager (520), and additional detail for some modules such as the resource manager (530).

The resource manager (530) includes a resource set manager (550), base resource set manager (540) and external resource manager (560). The resource manager (530) rations the limited resources of the device to application processes and helps enforce that rationing so that the user experience is both predictable and in accord with policies regarding which experiences are to be prioritized over others. The resource manager (530) contains an array of pools of resources, such as the pool (541). This array represents the resources on the device, at least those available to clients of the resource manager (530). The resource manager (530) uses multiple pools, rather than one big pool, so that the resources in a given pool can be earmarked for a particular workload type. For example, one pool can be for foreground user experiences, another for UI-less background activities, etc. In this way, the resources of the device can be budgeted for the various types of workloads.

The base resource set manager (540) handles various operations on resources sets that are common to subclasses of resource sets (that is, base resources). The base resource set manager (540) maintains a list of free resources of various types, hands out resources when asked (or creates a pending request at a specified priority if the request cannot be satisfied immediately), frees resources when asked, notifies clients to release a resource (when a higher priority request comes in), determines when a pending request can be granted, and notifies the client when the pending request has been granted.

An external resource is a resource that the resource manager (530) manages but does not directly do the enforcement for. The resource manager (530) relies on a separate process (shown as the external resource owner (510) in FIG. 5; e.g., a device driver) to actually do enforcement and forcible releases. For example, media resources (such as a camera, speaker, etc.) and a proximity sensor are external resources. The external resource manager (560) decides which task, process, etc. has access to the external resources and when, but relies on the external resource owner (510) to actually grant and revoke access to an external resource.

In the example implementations, a resource set describes a set of rules for how a process can run, based on decisions of the execution manager (520) about what type of workload that process is performing (e.g., a background agent, a UI app in the foreground, a UI app pausing, etc.) A resource set include a set of two resources (CPU and memory) managed generically by the base resource set manager (540). A resource set also accounts for several other policy decisions around how a process is allowed to run. In FIG. 5, resource set type information is stored in the resource set policy table (551). For example, for each resource set type, the resource set policy table stores (a) what priority class the process will run in, (b) whether the process has the right to acquire specific external resources (e.g., camera, speaker, proximity/NFC sensor), and if so, at what priority, (c) whether the CPU percentage is a hard maximum (even if the CPU is under-utilized), (d) at what level a commit memory warning is to be sent to the process, and (e) how much CPU percentage, if any, the process can borrow from the foreground.

Each resource set type is associated with one pool, from which it draws its resources. Multiple resource set types can share one pool, in which case the base resource set manager (540) enforces priority-based sharing, as described above.

Unlike the external resource manager (560), the resource set manager (550) does its own enforcement of resource sets, with the help of the resource enforcer (580) and kernel job objects of the kernel (590) accessed through the job object API (591). The resource set manager (550) does its own forcible releases, with the help of the various task managers in execution manager (520).

Interface and Type Definitions in the Example Implementations

FIGS. 6a-6l are a pseudocode listing (600) that includes interface definitions and type definitions used for quota-based resource management in the example implementations. FIG. 6a shows a listing for PoolType, which indicates types of pools. FIGS. 6a-6b also shows listings for the type ResourceInfoQ. FIG. 6c shows a declaration for a callback interface IBaseResourceSetCallback, which is exposed as an interface (552) by the external resource manager (560) and resource set manager (550) for callback notifications from the base resource set manager (540). FIG. 6c also shows a definition of states for a base resource set. The class BaseResourceSet (declared in FIGS. 6c and 6d) includes methods exposed as part of an interface (542) by the base resource set manager (540) and called by the external resource manager (560) or resource set manager (550) to acquire resources or release resources of a base resource set.

FIG. 6e shows a listing that enumerates resource set types. The callback interface (IResourcSetCallback) is exposed an interface (574) by each of the task managers (571, 572) and called by the resource set manager (550). FIGS. 6e and 6f include a listing for the class ResourceSetInfo for resource set type information. FIG. 6f shows a listing for the class ResourceSet, which includes an "Apply" method.

FIG. 6g shows listings for an ExternalResourcSet. FIG. 6g also enumerates types of notifications sent to an external resource owner (510) as ExternalResourceNotification.

FIGS. 6h and 6i (top) show the interface definition for an interface (553) exposed by the resource manager (530) (actually, the resource set manager (550)). The interface (553) includes methods called to acquire a resource set (AcquireResourceSet) or release a resource set (ReleaseResourceSet). FIGS. 6i-6l show definitions for other interfaces exposed by the resource manager (530), e.g., for an interface (561) exposed by the external resource manager (560). In FIGS. 6i-6l, methods that have the "Rm" prefix have flat RPC wrappers of the same name exposed.

Pools and Resource Set Types in the Example Implementations

At a high level, a resource set type can be viewed as part of a scenario or type of workload that a process is implementing. For example, a foreground resource set is for a user's foreground UI application. FIG. 7 shows a table (700) of information for resource set types in the example implementations. The values shown for different resource set types are example values that result from tuning for a typical high-end computing device. For another class of device (e.g., low-end device, medium-tier device, premium device), the values may be different, even if the possible resource set types are unchanged. Or, the possible resource set types may be different in a table for another class of device. In general, different classes of computing devices will have different tables of values for resource set types. In FIG. 7, the System resource set is a pseudo-resource set that represents the resource usage of the operating system and system components, which are not managed by the resource manager (530). The table (700) can be read from the registry or another data store. If an entry in the table lacks a value, a default value is used. The table (700) embodies policies for resource set types and budgeting of resources, rather than implement such policies in code.

The following table shows definitions for fields in the table (700) in FIG. 7.

| Field | Description | Default value |
| --- | --- | --- |
| Pool | The pool that this resource set gets its resources from. | |
| ResourceSet TypePriority | The overall priority of this resource set type within its pool. In other words, the order in which resource sets are checked to see if newly available resources can satisfy their pending requests. This acts as a tie-breaker when the priorities of the individual resource sets are equal, or not strictly ordered (e.g., one set has resource A at priority 1 and resource B at priority 2, and another set has A at priority 2 and resource B at priority 1). | 1 |
| CPU Priority | The priority at which this resource set acquires its CPU. Higher priority requests (within the same pool) can cause the CPU resource to be forcibly released, which in turn would cause a task manager (571, 572) to terminate the process. This is different than the kernel (590) notion of CPU (thread) priority. | 1 |
| CPU Amount | The percent of CPU the process is guaranteed. | |
| Commit Memory | The priority at which this resource set acquires its memory. Higher priority requests (within the same pool) | 1 |

-continued

| Field | Description | Default value |
|---|---|---|
| Priority | can cause the resource to be forcibly released, which in turn would cause a task manager (571, 572) to terminate the process. | |
| Commit Memory Amount | The maximum amount of memory the process can commit (i.e., allocate). Any attempted allocation past this point will fail. | |
| Camera Priority | The priority at which this process can acquire the camera resource. The value may be "NotAllowed" in which case this process cannot acquire the resource at all. Unless NotAllowed, this priority can be overridden by an explicit priority passed in by the external resource owner (510) when it acquires the resource. | NotAllowed |
| Speaker Priority | See Camera Priority. There will be one entry for every external resource type. Camera and Speaker are just examples. | NotAllowed |
| CPU Loan | How much of the CPU value is to be borrowed from a foreground resource set or the foreground pool. | 0 |
| Hard CPU Limit | Whether the process will have its CPU usage capped by its resource set even if there are spare CPU cycles available. This may be useful for verifying that a process can run successfully under worst-case conditions. | No |
| Commit Memory Warning | The level at which the resource manager (530) will send a message to the host, warning the host that it is approaching its commit limit. | |
| Killable? | Whether the low memory handler (531) is allowed to kill the process. | No |
| Priority Class | The priority given to the process by the kernel (590) for CPU, and possibly also I/O and physical memory. | NORMAL_PRIORITY_CLASS |

FIG. 8 shows a table (800) of information for pools. The values shown for different pools are example values that result from tuning for a typical high-end computing device. For another class of device (e.g., low-end device, medium-tier device, premium device), the values may be different, even if the possible pools are unchanged. Or, the possible pools may be different in a table for another class of device. In general, different classes of computing devices may have different tables of values for pools. The table (800) can be read from the registry or another data store. The table (800) embodies policies for pools and budgeting of resources, rather than implement such policies in code.

In a computing device with multiple cores, the job object API (591) allows a process to be assigned a percentage of a single CPU or a percentage of all CPUs. By default, the CPU amount is applied for all CPUs, which harnesses the performance and battery improvements of using multiple cores. Alternatively, the kernel (590) can allow assigning different percentages to different CPUs.

Through limits in resource set types, background applications are already limited in the percent of CPU they can consume. Even under these limits, however, background applications can indirectly interfere with foreground tasks, e.g., (1) by making I/O requests that block I/O requests of the foreground, or (2) by consuming physical pages and thereby causing the foreground to page. To address these problems, the resource manager (530) can manage priority access to I/O and physical pages of memory as a resource. For example, the table (700) indicates a priority class for each resource set type. Typically, a background resource set type has a priority class of PROCESS_MODE_BACKGROUND_BEGIN. In addition to reducing the I/O priority and the paging priority, this also reduces the CPU priority, which is acceptable because the other resource sets have their own CPU percent limits, and once they are reached, lower priority processes (such as one with PROCESS_MODE_BACKGROUND_BEGIN as priority) will run. If, for some reason, a lowered CPU priority is problematic or undesirable, the resource enforcer (580) can call a method to manually to set the I/O priority and paging priority separately from the CPU priority. The table (700) could then be updated to include columns for each of these individually.

The resource manager (530) also has a role in garbage collection for memory. The resource enforcer (580), through the job objects API (591), has support for sending a notification when a process's memory is approaching its commit limit. The resource manager (530) listens for such notifications and can look up a task host object corresponding to the process ID in the notification. If pTaskHost→HasRunningTaskInstance( ) is true, the resource manager (530) will call TaskHost::SendCommand(REDUCEMEM_HOST). By checking for a running task instance, the resource manager (530) avoids paused or frozen applications. When a task host receives the REDUCEMEM_HOST notification, garbage collection can be performed. To avoid excessive garbage collection calls, the resource manager (530) may notify the application only when the level has increased by 1 MB or more. In the table (700) shown in FIG. 7, the values of warning levels are in the field CommitMemoryWarning.

When the low memory handler (531) detects low available physical memory, it will send a REDUCEMEM_HOST message to all active task hosts. This will give the hosts the opportunity to free up memory if they can, most likely via garbage collection.

Examples of Acquiring and Releasing Resource Sets in the Example Implementations FIG. 9 shows a state diagram (900) for states of a resource set. A resource set can be released, pending or acquired. Some state transitions are associated with calls through an interface (553) exposed by the resource set manager (550), such as calls from a task manager to the AcquireResourceSet method defined in FIG. 6h. Other state transitions are associated with callback notifications to a task manager, such as notifications through the IResourceSetCallback interface (574) defined in FIG. 6*e*.

In FIG. 9, to acquire a resource set for a process, a task manager calls pResourceManager→AcquireResourceSet(resourcesettype, pCallback, &fPending, &pResourceSet). The resource set manager (550) looks up the corresponding pool and requests the resources from that pool. If the resources are immediately available, the resource set manager (550) returns with fPending==false.

If the resources from a base resource set are not immediately available, then fPending will be true, unless the caller has specified it would rather give up immediately. If the unavailable resources can be forcibly released from lower priority processes, then the base resource set manager (540) assists in releasing the resources. FIG. 10*a* is a sequence diagram (1001) that shows method calls, returns, notifications, etc. in this situation. A task manager calls the AcquireResourceSet method of the interface (553) exposed by the resource set manager (550), which calls the AcquireResources method of the interface (542) exposed by the base resource set manager (540). In this situation, the resources are unavailable (fPending==true) as indicated in notifications through the callback interfaces (552, 574). The base resource set manager (540) also sends a notification through the callback interface (552) exposed by the resource set manager (550), in order to trigger a notification through the callback interface (574) exposed by the previous task manager, asking the previous task manager to release the resources from the lower priority resource set. The previous task manager coordinates with the kernel (590) to terminate the process that uses the lower priority resource set. When the process terminates, the resource manager (530) is notified. The resource manager (530) notifies the resource set manager (550), which in turn notifies the base resource set manager (540) through the interface (542) that the resource set has been released. The base resource set manager (540) allocates the resource set for the pending request and sends an "OnAcquired" notification through the callback interface (552) exposed by the resource set manager (550). This triggers a notification through the callback interface (574) exposed by the task manager, which applies the resource set.

If the resources cannot be forcibly released (e.g., because they are applied by higher priority processes), then the call from the task manager to the resource set manager (550) will still return with fPending=true. The caller can wait until some possible point in the future, when the resource manager (530) sees that the resources have become available. FIG. 10*b* is a sequence diagram (1002) that shows method calls, returns, notifications, etc. in this situation. Most operations are the same as in FIG. 10*a*, but the process that currently has the requested resources terminates normally, instead of the previous task manager requesting termination.

Thus, in the example implementations, a process has a resource set applied to it at all times. When the process is first created, the task manager creates the process in a suspended state, acquires the resource set, then resumes the process, so that the process will not consume excess resources in the interim. A task manager is allowed to apply a different resource set to a process that already has one. In this case, the resource manager will release the old resource set.

For an application in the pausing state, the application is given a real resource set of the "pausing" type. The pausing resource set type is similar to the foreground resource set type, except that the CPU percentage guarantee is smaller. The working set of memory and process priority for the pausing resource set type are not dramatically reduced—applying enough resources to allow a pausing application to finish quickly and free all of its memory is typically preferable to having the application forcibly terminated when a timer expires, which could corrupt the persistent state of the application.

Some time (e.g., 20 seconds) after an application loses the foreground resource set, after the application has had a chance to end gracefully using a pausing resource set, the quota-based resource management will release the pausing resource set and apply a paused resource set to the process. The paused resource set type allows the application a tiny bit of CPU to handle any straggling events or callbacks. In some implementations, the paused resource set type has a soft CPU limit, such that a paused application can potentially use unused processing cycles in the system. Alternatively, the paused resource set type has a hard CPU limit so the application cannot violate its limit. Some time (e.g., 60 seconds) after that, the quota-based resource management will release the paused resource set and apply a frozen resource set, which effectively allows no CPU by applying a hard CPU limit of 0%. Some applications can be designed to transition directly from a pausing resource set to a frozen resource set.

Child Resource Sets in the Example Implementations

In the example implementations, a resource set can lend some of its resources to a new child resource set, which can then be granted to a different process. The main example is a foreground application lending some of its resources to a foreground agent. Another example is a VoIP UI app lending most of its resources to its VoIP communication agent. A child resource set is created in a similar fashion to a normal resource set, except the caller manually fills in at least some of the ResourceSetInfo to describe how big the child resource set is, for example, as shown in the listing (1100) in FIG. 11.

The resource manager (530) verifies that the parent resource set has sufficient resources to grant the request. If it does, the resource manager (530) will subtract those resources from the parent resource set, grant the new smaller resource set to the parent, then create a new child resource set and return it. The commit memory that the parent resource set is already using (e.g., through memory allocation operations) cannot be given to a child resource set. Thus, the parent's current usage can affect whether the AcquireResourceSet request will succeed for the child resource set. Calling AcquireResourceSet early in the parent's lifetime makes it more likely to succeed, before the parent resource set has a chance to exceed its smaller limit. Full recursion is supported. So, a caller can create a child resource set of a fixed size, then use that to create grandchildren resource sets which are applied to processes.

When a child resource set is released (by calling ReleaseResourceSet), the resources are returned to its parent resource set. If the parent resource set had applied any resources to a process, the newly returned resources can be (additionally) applied at this time. The process of releasing resources through ReleaseResourceSet is recursive, such that child resource sets are released if their parent resource set is released.

Thus, a pool contains free resources, and a resource set contains acquired or pending resources. At the implementation level, a pool and resource set can be implemented as the same class of structure. A pool is a resource set that happens to be free. The equivalence between pools and resource sets becomes even more clear when considering child resource sets. In that case, the parent resource set, which has already been acquired, is acting as the pool from which the child resource set draws resources. A pool of free resources can be implemented as a root parent resource set. The act of releasing a resource set means giving that set's resources back to its parent resource set. Likewise, the act of acquiring a resource set means carving resources off from the parent resource set.

Loaned Resources in the Example Implementations

In the example implementations, some resource sets are allowed to borrow CPU from the foreground. The amount they are allowed to borrow can be specified in the resource set type information, for example, as shown in the CPU loan field of the table (700) of FIG. 7. When a resource set is granted, if any portion of the CPU granted as part of the resource set is a loan, then that amount is deducted from the foreground resource set or, if there is no foreground resource set, from the foreground pool. The loaned amount is noted, so that if a foreground resource set is created later, the loaned amount can be subtracted from the default amount in the table (700). When the resource set is released, the loaned amount is returned to the foreground resource set or foreground pool.

If the foreground resource set has descendants (child resource sets), then the amount borrowed from each descendant (including the root) is proportional to the amount of CPU that descendant has, divided by the total amount owned by all descendants. Care is taken to ensure that the total amount borrowed is equal to the amount loaned, in order to prevent phantom resources from being created or lost. This can be ensured by keeping track of the amounts borrowed from descendants and setting the amount borrowed from the root to be the remaining balance rather than a proportion.

External Resources in the Example Implementations

An external resource is identified by a ResourceType, as shown in FIG. 6a. The external resource is owned by an external resource owner (510) such as a device driver or service, but managed through coordination with the resource manager (530). The external resource owner (510) can call into the external resource manager (560), which manages a single pool of free external resources of these various types. An external resource owner (510) can add its external resource(s) to the pool by calling the RmRegisterResource method as shown in the listing (1200) of FIG. 12 (see also FIG. 6i). Or, the external resource owner (510) can add its external resource(s) to the pool by registering a library such as a DLL with the resource manager (530), for example, with a registry entry for the resource manager (530). The DLL exposes the DLL entry point HRESULT Register (IExternalResourceRegister*pResourceRegister), where IExternalResourceRegister contains a method as defined in the listing (1300) in FIG. 13. The DLL's Register( ) entry point calls pResourceRegister→RmRegisterResource( ) one or more times. After Register returns, the resource manager (530) will unload the DLL.

For an external resource that has been registered, the fShareable flag indicates that the external resource manager (560) is free to give the external resource an unlimited number of times. It is possible, however, for a sharable external resource to be requested in exclusive mode, in which case the external resource is taken out of the free pool, and other existing users of the external resource put their usage of the resource on hold. When the exclusive resource is released, the other users are taken off hold.

A resource set type contains policy information about what rights a workload with such a resource set has to each of the external resources. For example, the policy information indicates whether the workload has the right to acquire the external resource at all and, if so, at what priority. In the table (700) of FIG. 7, the foreground resource set type has the right to acquire the camera resource, but no background resource set type does.

When a resource set with an external resource is applied to a process, several things happen. If a previous resource set has rights to an external resource but the new resource set does not, and the process has acquired the resource, then the external resource set is forcibly released. Existing external resource sets for that process are updated with the new priorities dictated by the resource set. Pending external requests are checked for satisfiability, since the change in priorities may have made a request satisfiable. It is also possible for an owner to request an external resource with a specific priority, ignoring any priority derived from the resource set. This would be the case when the resource set has no effect on a specific external resource, for example, when the external resource does not care about foreground status versus background status, but the owner may have some other criteria to determine priority.

External resources are acquired asynchronously because it may take time for the previous acquirer to release the resource. A request for external resource can be in one of four states, as shown in the following table.

| State | Description |
| --- | --- |
| Released | The resource is not acquired, and there is no handle to it. |
| Pending | The resource is not acquired, but the handle is waiting for it, and a notification will be sent when it is acquired. |
| Acquired | The resource is acquired, meaning the caller can now use it. |
| Hold | The caller can hold on to the resource but not actively use it. For example, it does not tear down the entire media stack, but instead pauses the playing of audio. |

FIG. 14 shows a state diagram (1400) for states of an external resource. Some state transitions are associated with calls through an interface (561) exposed by the external resource manager (560), such as calls from an external resource owner (510) (see FIG. 6h). Other state transitions are associated with notifications to an external resource owner (510), such as values of ExternalResourceNotification defined in FIG. 6g.

When the external resource owner (510) wants to acquire one or more external resources (most likely on behalf of a client application), the owner calls RmAcquireResources, for example, as shown in the listing (1500) of FIG. 15. More than one resource at a time can be requested if those resources are held as a group (e.g., resources used together or not at all). On the other hand, if external resources might be separately usable when one is revoked (e.g., a VoIP app gets its video but not its audio revoked when going to the background), the owner uses separate requests so that there are distinct handles for each part of the request, and the resource manager (530) will be able to send a release request or hold request for each part individually. FIG. 16 is a sequence diagram (1600) that shows a sequence in which an owner acquires an external resource that is currently held by another owner (previous owner).

Several types of events can cause a release request to be sent for an external resource. Such an event creates a list of handles the request will be sent to. For example, when a RmAcquireResources call with a higher priority has come in, one or more handles are released to satisfy it. Or, when a process has changed its resource set (e.g., when a process goes into the background) and the new resource set does not have the right to certain external resources, the list of handles is all the handles associated with that process which contain an external resource the resource set does not have rights to. Or, when a process finishes (including unexpected or abnormal process terminations), with the execution manager (520) calling the resource manager (530) to let it know, the list of handles is all the handles associated with that process. For each handle h in the list of handles, the resource manager sends a notification as shown in the listing (1700) of FIG. 17. This notifies the external resource owner (510) that the handle is to be released, and the owner calls RmReleaseResources.

The external resource owner (510) can also voluntarily release the resource by calling HRESULT RmReleaseResources(_____ in ResourceHandle handle). The resource manager (530) will then remove the handle from its table and evaluate whether any pending requests can be satisfied. If not used to satisfy a pending request, the resources will be released back to the free pool.

If the owner process terminates unexpectedly, its resources are released. To accomplish this, the ResourceHandle type is an RPC context handle. The RPC infrastructure will call a ResourceHandle_rundown( ) function if the owner crashes, and RmReleaseResources is called to release the resources.

V. Example Mobile Computing Devices.

Figure 18:
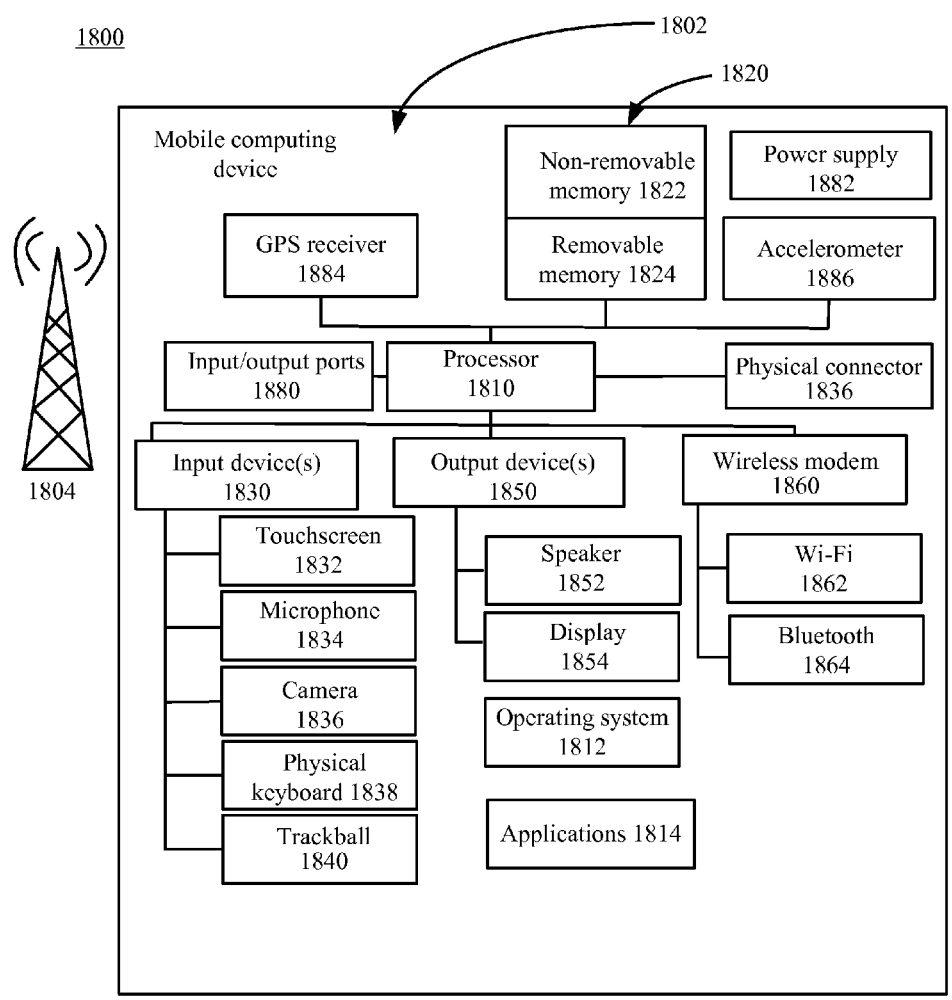
FIG. 18 is a diagram of a generalized mobile computing device in which at least some of the innovations described herein can be implemented.

FIG. 18 is a system diagram depicting a generalized mobile computing device (1800) including a variety of optional hardware and software components, shown generally at (1802). In general, a component (1802) in the mobile computing device (800) can communicate with another component, although not all connections are shown, for ease of illustration. The mobile computing device (800) can be any of a variety of computing devices (e.g., cell phone, smartphone, handheld computer, personal digital assistant (PDA), etc.) and can allow wireless two-way communications with one or more mobile communications networks (1804), such as a cellular or satellite network.

The mobile computing device (800) can include a controller or other processor (1810) (e.g., signal processor, microprocessor, ASIC, or other control and processing logic circuitry) for performing such tasks as signal coding, data processing, input/output processing, power control, and/or other functions. An operating system (1812) can control the allocation and usage of the components (1802) and support for one or more applications (1814). The applications can include common mobile computing applications (e.g., include email applications, map navigation tools, calendars, contact managers, web browsers, messaging applications), or any other computing application.

The mobile computing device (800) can include memory (1820) and/or other tangible computer-readable media. Memory (1820) can include non-removable memory (1822) and/or removable memory (1824). The non-removable memory (1822) can include RAM, ROM, flash memory, or other well-known memory technologies, or a disk drive or other well-known storage technologies such as a CD or DVD. The removable memory (1824) can include flash memory or a Subscriber Identity Module card, which is well known in GSM communication systems, or other well-known memory storage technologies, such as smart cards. The memory (1820) can be used for storing data and/or code for running the operating system (1812) and the applications (1814). Example data can include web pages, text, images, sound files, video data, or other data sets to be sent to and/or received from one or more network servers or other mobile computing devices via one or more wired or wireless networks.

The mobile computing device (800) can support one or more input devices (1830), such as a touchscreen (1832), microphone (1834), camera (1836), physical keyboard (1838) and/or trackball (1840) and one or more output devices (1850), such as a speaker (1852) and a display (1854). Other possible output devices (not shown) can include a piezoelectric or other haptic output device, or a proximity sensor. Some devices can serve more than one input/output function. For example, touchscreen (1832) and display (1854) can be combined in a single input/output device.

Touchscreen (1832) can accept input in different ways, For example, capacitive touchscreens detect touch input when an object (e.g., a fingertip providing gesture input, or a stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens.

A wireless modem (1860) can be coupled to an antenna (not shown) and can support two-way communications between the processor (1810) and external devices. The modem (1860) is shown generically and can include a cellular modem for communicating with the mobile communication network (1804) and/or other radio-based modems (e.g., Bluetooth or Wi-Fi). The wireless modem (1860) is typically configured for communication with one or more cellular networks, such as a GSM network for data and voice communications within a single cellular network, between cellular networks, or between the mobile computing device (800) and a public switched telephone network.

The mobile computing device (800) can further include at least one input/output port (1880), a power supply (1882), a satellite navigation system receiver (1884), such as a global positioning system receiver, an accelerometer (1886), a transceiver (1888) (for wirelessly transmitting analog or digital signals) and/or a physical connector (1890), which can be a USB port, IEEE 1394 (firewall) port, and/or RS-232 port. The illustrated components (1802) are not required or all-inclusive, as components can be deleted and other components can be added.

For the sake of presentation, the detailed description uses terms like "determine" and "perform" to describe computer operations in a computing environment. These terms are high-level abstractions for operations performed by a computer, and should not be confused with acts performed by a human being. The actual computer operations corresponding to these terms vary depending on implementation.

VI. Alternatives.

Various alternatives to the example implementations presented herein are possible. Although many of the foregoing examples involve mobile computing devices, alternatively, the innovations can be applied for other types of devices.

In many of the examples described herein, a pool sets an upper limit on resources used for the associated workload or workloads that draw resources from the pool. In other examples, sharing of resources between pools is supported under limited circumstances, e.g., through loaned resources from a foreground resource set or foreground pool so as to share resources between the foreground pool and one or more other pools. Alternatively, resources can be loaned from another type of pool (i.e., not just the foreground pool). Also, within a pool, sharing of resources can be supported between a parent resource set and one or more child resource sets. Aside from these options, the resources allocated to the respective pools can be adjusted in the pool information that sets an overall budget of resources of a computing device. For example, the pool information can be adjusted to reconfigure quota-based resource management depending on the type of user (business user, general consumer, etc.), which classes of applications are installed on a device, and so on. Collectively, the quota-based resource management provides various ways to share resources and perform load balancing of resources across pools and/or within a pool.

In general, techniques described with reference to flowchart diagrams can be altered by changing the ordering of stages shown in the flowcharts, by repeating or omitting certain stages, etc. As another example, systems described with reference to system diagrams can be altered by changing the ordering of processing stages shown in the diagrams, by repeating or omitting certain stages, etc. As another example, although some implementations are described with reference to specific devices and resource types, described techniques and tools can be used with other devices and/or other resource types.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device, a method comprising:
    receiving a request for a resource set that is to be applied from one of multiple pools of resources, each of the multiple pools being associated with a different workload type, wherein the multiple pools at least in part specify a budget of resources of the computing device among the different workload types, respectively, wherein the requested resource set has a resource set type selected from among multiple resource set types based on type of a task, and wherein, for each of the multiple resource set types, resource set type information specifies:
        one or more resource quotas each including an amount value for a resource type; and
        a pool identifier that indicates one of the multiple pools;
    with a resource manager executing in the computing device, evaluating the request based at least in part upon the budget, including selecting a pool of the multiple pools based upon the pool identifier for the resource set type of the requested resource set; and
    sending a reply to the request.

2. The method of claim 1 wherein a data store on the computing device stores pool information that defines the multiple pools for the different workload types, respectively.

3. The method of claim 2 wherein, for each given pool of the multiple pools, the data store includes a processor use limit and a memory limit for the given pool.

4. The method of claim 1 wherein, for each of the multiple resource set types, resource set type information further specifies:
    one or more priority values each indicating a priority for the resource set type within the indicated pool.

5. The method of claim 1 wherein a data store on the computing device stores the resource set type information.

6. The method of claim 1 wherein the evaluating further includes:
    determining whether sufficient resources are free within the selected pool based upon currently available resources in the selected pool and the one or more resource quotas for the resource set type of the requested resource set.

7. The method of claim 6 wherein the evaluating further includes:
    if sufficient resources are not free within the selected pool, determining whether a previous resource set applied from the selected pool has priority lower than the resource set type of the requested resource set and, if so, requesting release of the previous resource set.

8. The method of claim 1 wherein the request is received from a task manager, and wherein the reply is sent to the task manager.

9. The method of claim 1 wherein the multiple pools include a first pool associated with a system workload type, a second pool associated with a foreground workload type, a third pool associated with a background user experience workload type, and a fourth pool associated with a background processing workload type.

10. The method of claim 9 wherein the multiple pools further include one or more pools each associated with a workload type for a specific class of applications and one or more pools each associated with a workload type for a non-active state for applications.

11. A computing device comprising a processor and a memory that implement a task manager, the task manager being configured to perform resource management comprising:
    based on type of a task, selecting a resource set type from among multiple resource set types associated with multiple pools of resources, each of the multiple pools being associated with a different workload type, wherein the multiple pools at least in part specify a budget of resources of the computing device among the different workload types, respectively, and wherein, for each of the multiple resource set types, resource set type information specifies:
        one or more resource quotas each including an amount value for a resource type; and
        a pool identifier that indicates one of the multiple pools;
    sending a request for a resource set of the selected resource set type, the request including information that indicates the pool identifier of the selected resource set type for selecting a pool of the multiple pools; and
    receiving a reply to the request for the resource set.

12. The computing device of claim 11 wherein, for each of the multiple resource set types, resource set type information further specifies:
    one or more priority values each indicating a priority for the resource set type within the indicated pool.

13. The computing device of claim 11 wherein a data store on the computing device stores the resource set type information.

14. The computing device of claim 11 wherein the resource management further comprises:
    receiving a request to execute the task, wherein the selecting the resource set type and sending the request for the resource set are responsive to the request to execute the task.

15. The computing device of claim 14 wherein the reply to the request for the resource set is an acceptance, the resource management further comprising, after launching of the task, applying the resource set to the task.

16. The computing device of claim 14 wherein the reply to the request for the resource set is a refusal, the resource management further comprising putting the request for the resource set in a queue for later processing.

17. The computing device of claim 14 wherein the reply to the request for the resource set is an indication that the request for the resource set is pending release of resources, the resource management further comprising, upon notification of the release of resources and after launching of the task, applying the resource set to the task.

18. The computing device of claim 11 wherein the resource management further comprises, after launching of the task, applying the resource set to the task, and wherein for the task an operating system enforces the budget of resources according to the selected resource set type.

19. The computing device of claim 11 wherein the multiple pools include a first pool associated with a system workload type, a second pool associated with a foreground workload type, a third pool associated with a background user experience workload type, and a fourth pool associated with a background processing workload type.

20. The computing device of claim 19 wherein the multiple pools further include one or more pools each associated with a workload type for a specific class of applications and one or more pools each associated with a workload type for a non-active state for applications.

21. A mobile computing device comprising a processor and memory that stores budget information adapted to resources of the mobile computing device, the budget information including:

pool information for multiple pools of resources, each given pool of the multiple pools being associated with a different workload type, wherein the multiple pools at least in part specify a budget of resources of the mobile computing device among the different workload types, respectively, the pool information including, for each given pool of the multiple pools, (a) a memory limit for the different workload type associated with the given pool, and (b) a processor use limit for the different workload type associated with the given pool; and resource set type information for multiple resource set types, wherein a given resource set type for a request is selectable from among the multiple resource set types based on type of a task, the resource set type information including, for each given resource set type of the multiple resource set types, (a) one or more resource quotas, each of the one or more resource quotas including an amount value for a resource type, (b) a pool identifier that indicates one of the multiple pools, the pool identifier being usable to select the one of the multiple pools during evaluation of the request, and (c) one or more priority values each indicating a priority for the resource set type within the indicated pool.

\* \* \* \* \*